(12) United States Patent
LaCroix

(10) Patent No.: US 9,470,320 B1
(45) Date of Patent: Oct. 18, 2016

(54) BALL VALVE ASSEMBLY

(71) Applicant: Kelso Technologies, Inc., Delta (CA)

(72) Inventor: Barry LaCroix, Corunna (CA)

(73) Assignee: Kelso Technologies Inc., Surrey, BC (CA)

( * ) Notice: Subject to any disclaimer, the term of this patent is extended or adjusted under 35 U.S.C. 154(b) by 0 days.

(21) Appl. No.: 13/986,765

(22) Filed: Jun. 3, 2013

(51) Int. Cl.
*F16K 5/06* (2006.01)

(52) U.S. Cl.
CPC ........... *F16K 5/0694* (2013.01); *F16K 5/0657* (2013.01)

(58) Field of Classification Search
CPC .... F16K 27/067; F16K 5/0673; F16K 41/02; F16K 5/0663; F16K 5/0694; F16K 5/0657
USPC ...... 251/315.01, 315.04, 368, 214, 314, 316
See application file for complete search history.

(56) References Cited

U.S. PATENT DOCUMENTS

| | | | | |
|---|---|---|---|---|
| 450,451 | A | * | 4/1891 | Ferrell ........................ 116/277 |
| 3,380,708 | A | * | 4/1968 | Scaramucci .................. 251/172 |
| 3,462,120 | A | * | 8/1969 | Priese ................... F16K 5/0673 251/315.14 |
| 3,954,251 | A | * | 5/1976 | Callahan et al. ............. 251/288 |
| 4,374,583 | A | * | 2/1983 | Barrington .............. F16K 31/50 251/324 |
| 4,795,133 | A | * | 1/1989 | Berchem et al. ............. 251/171 |
| 4,815,700 | A | | 3/1989 | Mohrfeld |
| 5,577,709 | A | * | 11/1996 | Gugala et al. ........... 251/315.14 |
| 5,673,897 | A | * | 10/1997 | Crochet et al. .............. 251/63.6 |
| 5,906,354 | A | * | 5/1999 | Gilbert et al. ................ 251/214 |
| 6,007,049 | A | * | 12/1999 | Wass ....................... F16K 1/302 251/144 |
| 6,095,493 | A | * | 8/2000 | Velan ............................ 251/214 |
| 6,681,793 | B2 | | 1/2004 | Mike |
| 7,275,564 | B2 | | 10/2007 | Bazin |
| 2001/0035514 | A1 | | 11/2001 | Laskaris et al. |
| 2003/0205688 | A1 | * | 11/2003 | Milberger et al. ........ 251/315.01 |
| 2004/0069968 | A1 | | 4/2004 | Gillen |
| 2006/0013701 | A1 | | 1/2006 | Boos |

OTHER PUBLICATIONS

Technical Information, Rev. 1, Apr. 2002, Kalrez valve stem packing technical packinig technical guidelines and design to improve proces control and mimimize fugitive.
http://www.midlandmfg.com/file%20Library/product/General%20purpose%20car/BV/A-522-C2,png, Feb. 4, 2013.

(Continued)

*Primary Examiner* — Michael R Reid
(74) *Attorney, Agent, or Firm* — Adrienne B. Naumann

(57) ABSTRACT

Described herein is an improved ball valve assembly for use in a tank or a tank-like container. This improved ball valve assembly prevents leakage of a liquid with corrosive and abrasive contaminants within the tank or a tank like container. This improved ball valve assembly is especially useful in a railroad tank car that contains a liquid commodity in whenever a tank is mobile and subjected to wide temperature variations. The improved ball valve assembly contains a ball component made of a ceramic material. A ceramic wiper (i) mechanically seals against the ball component and (ii) prevents contaminants from embedding within, or otherwise abrading, top and bottom seats within the ball valve assembly. Also contained in the preferred embodiment of this invention is an improved drive coupling that (i) eliminates the previously existing need for custom square drive tool (ii) pre-attached to the ball valve assembly. The current invention also includes an improved stem packing assembly that reduces the number of annular components along the stem of the ball valve assembly.

14 Claims, 28 Drawing Sheets

(56) References Cited

OTHER PUBLICATIONS http://valves_and_instruments.com/jamesbury-manual-ball_valves.html?>jb_series=645, Jul. 31, 2013.
http://www.mckenzievalve.com/mvpages/FIRA.htm (as of Aug. 19, 2013).

DuPont Performance Elastomers, "Valve Stem Packing Technical Guidelines and Design to Improve Process Control and Minimize Fugitive Emissions" Rev. 1 Apr. 2002 Wilmington, Delaware, U.S.A., pp. 2,3 and 4.

* cited by examiner

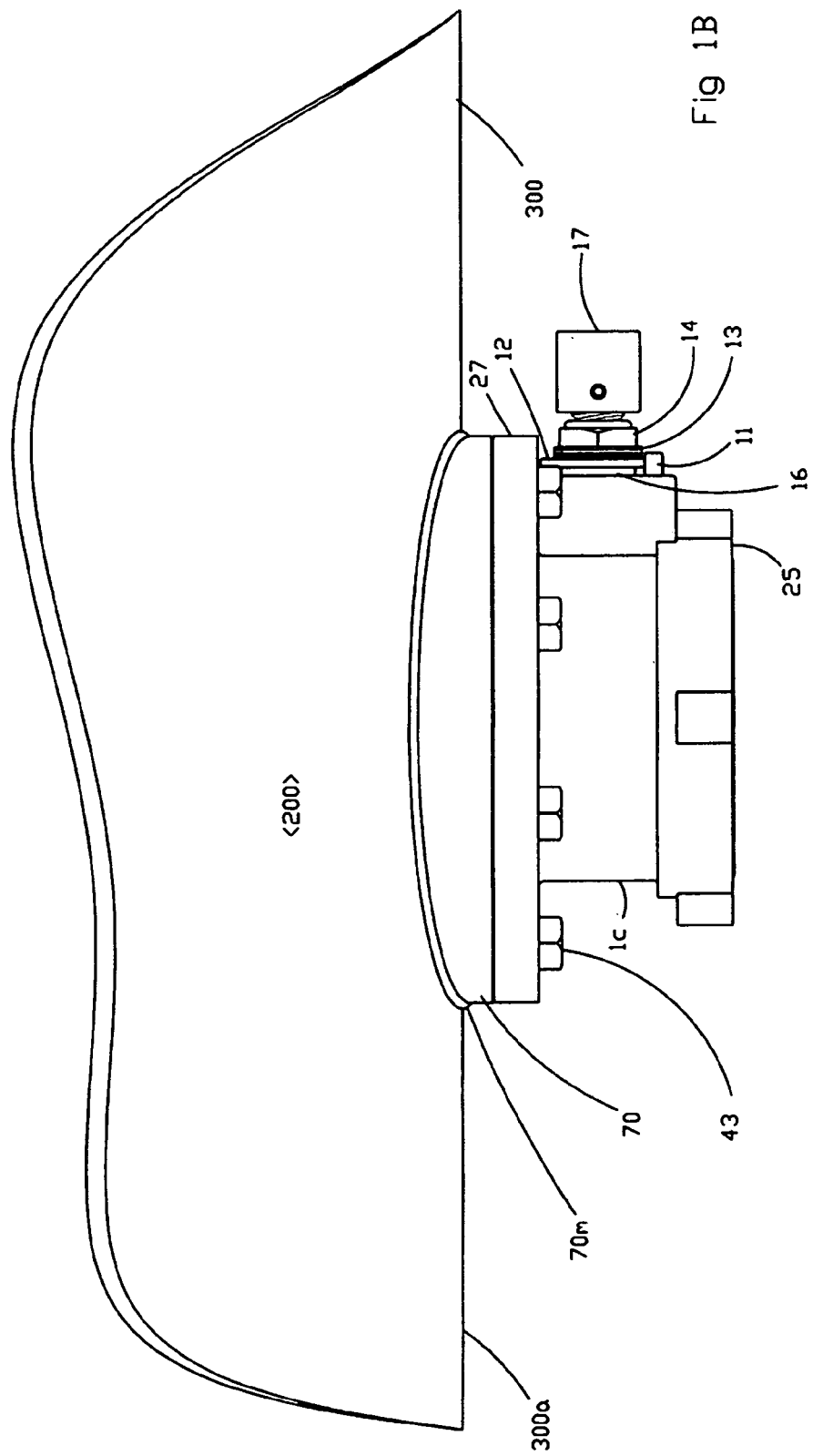

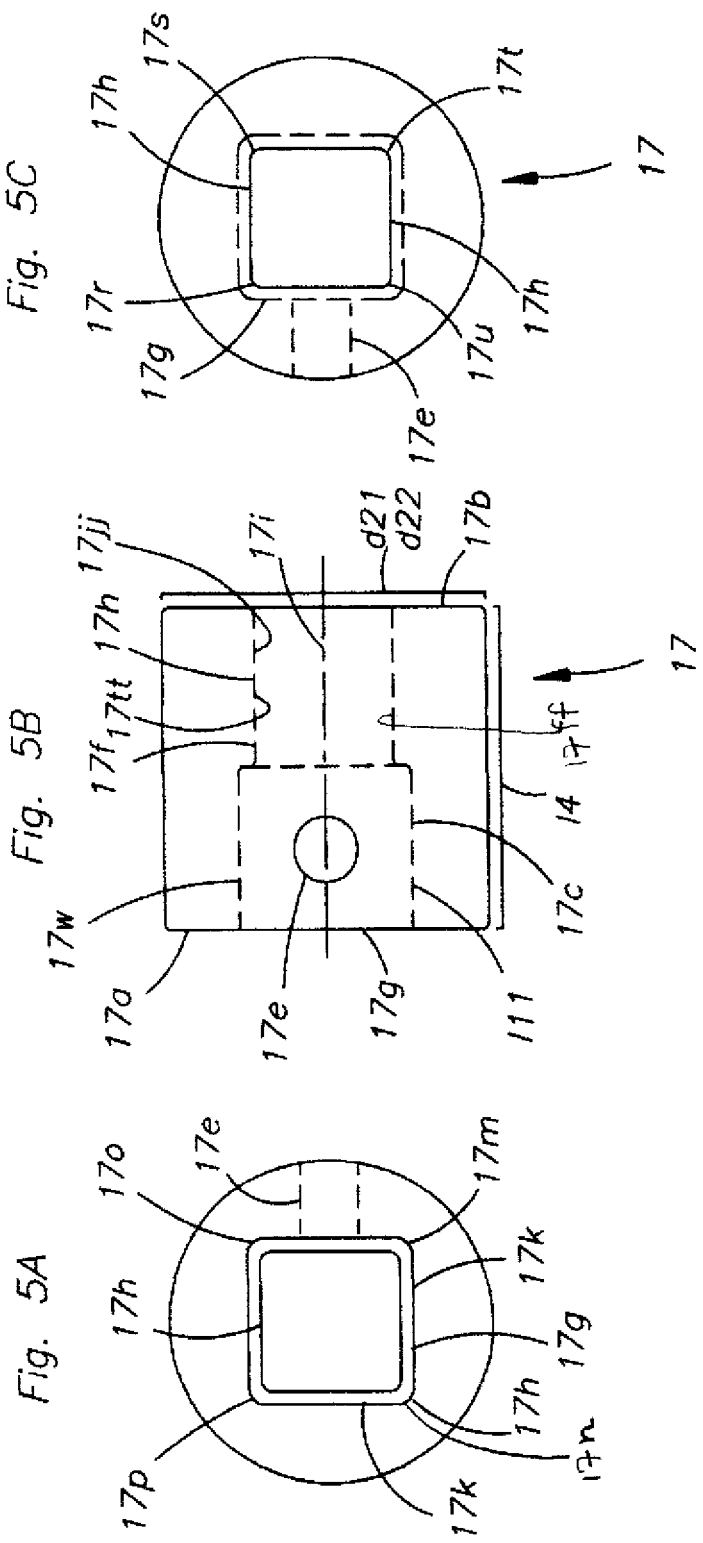

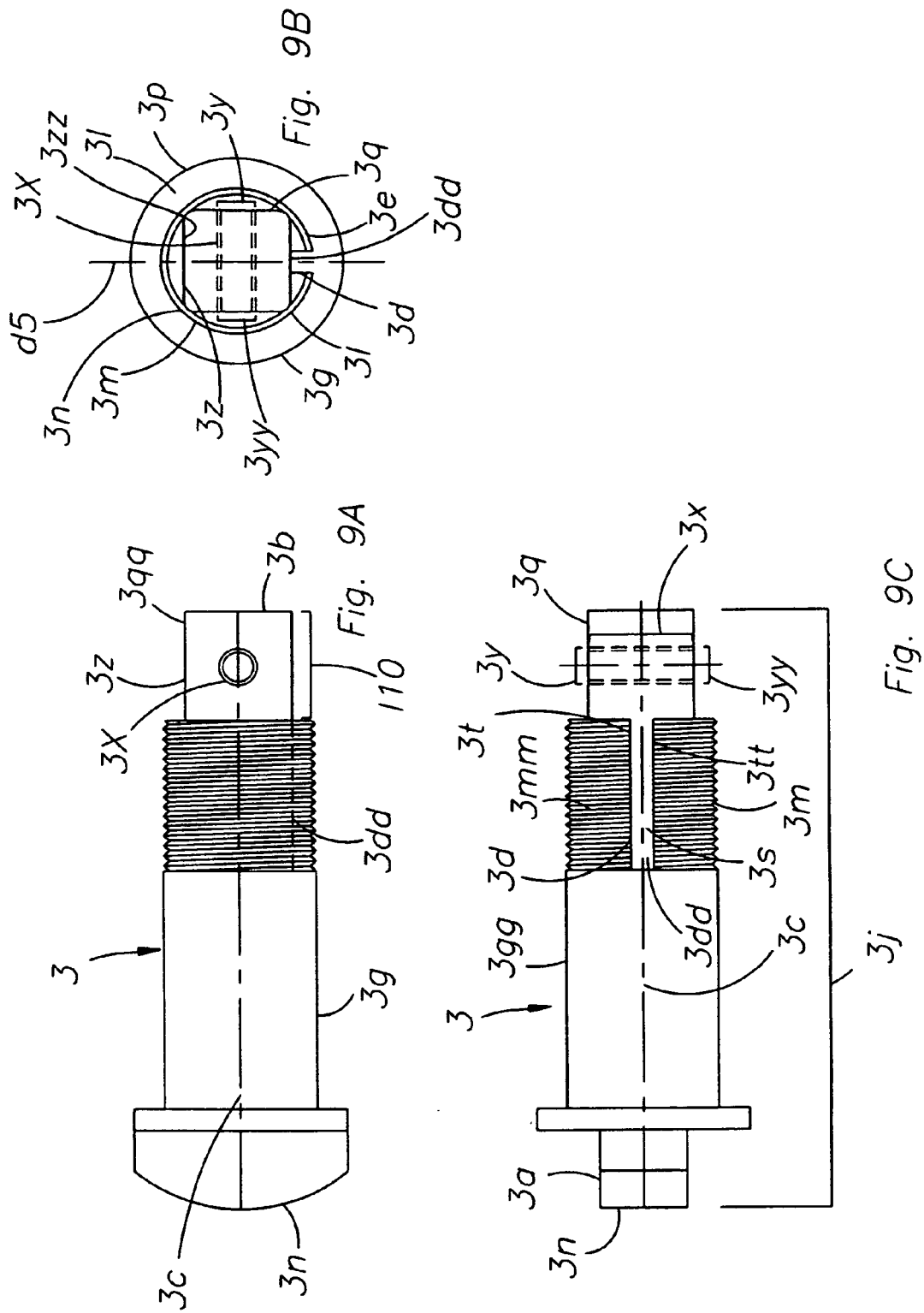

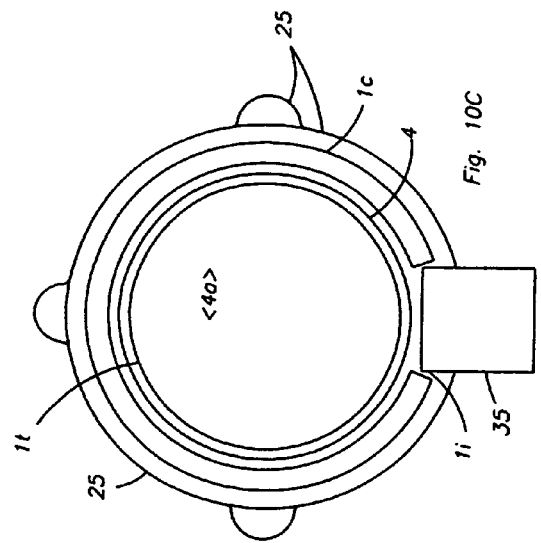
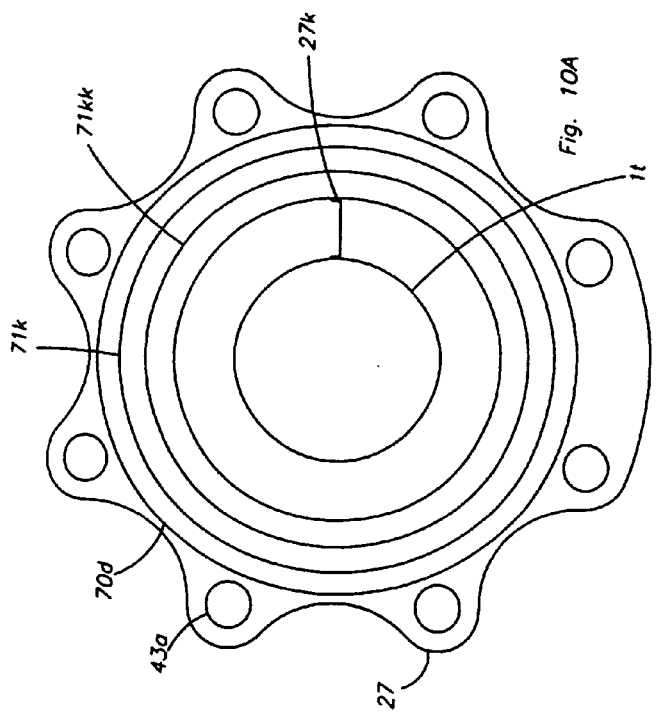
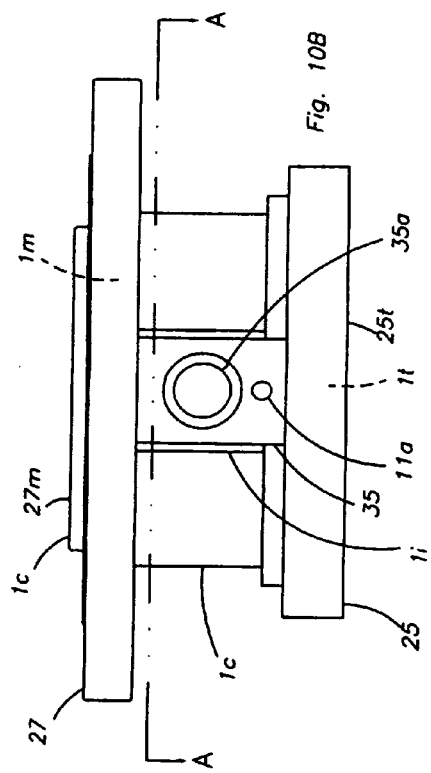
Fig. 10C
Fig. 10A
Fig. 10B

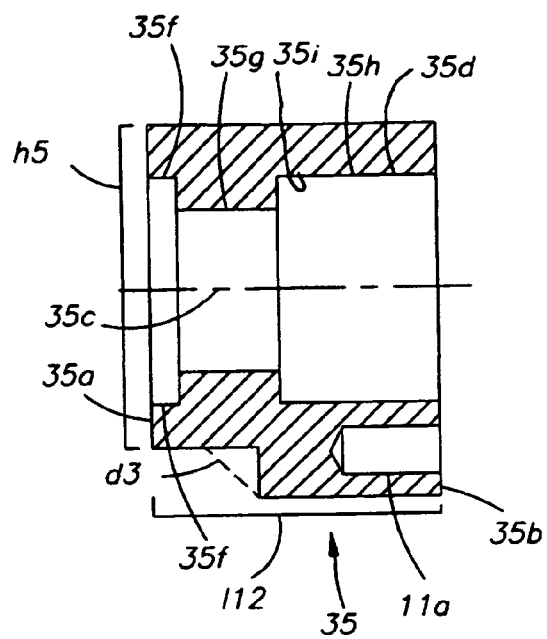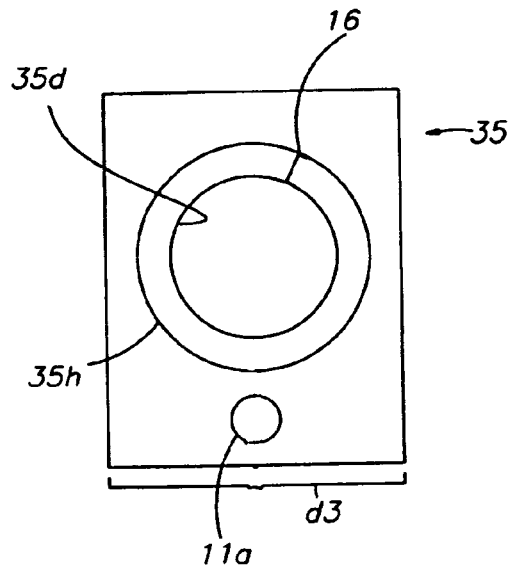
Fig. 13B
Fig. 13C
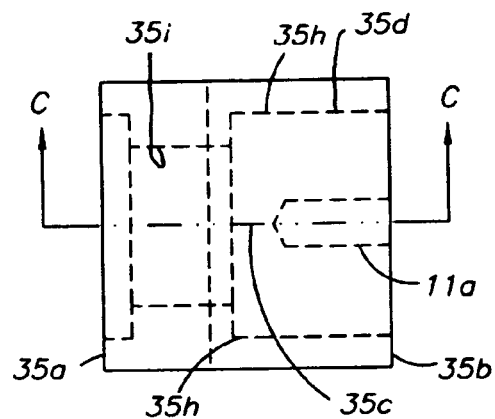
Fig. 13A

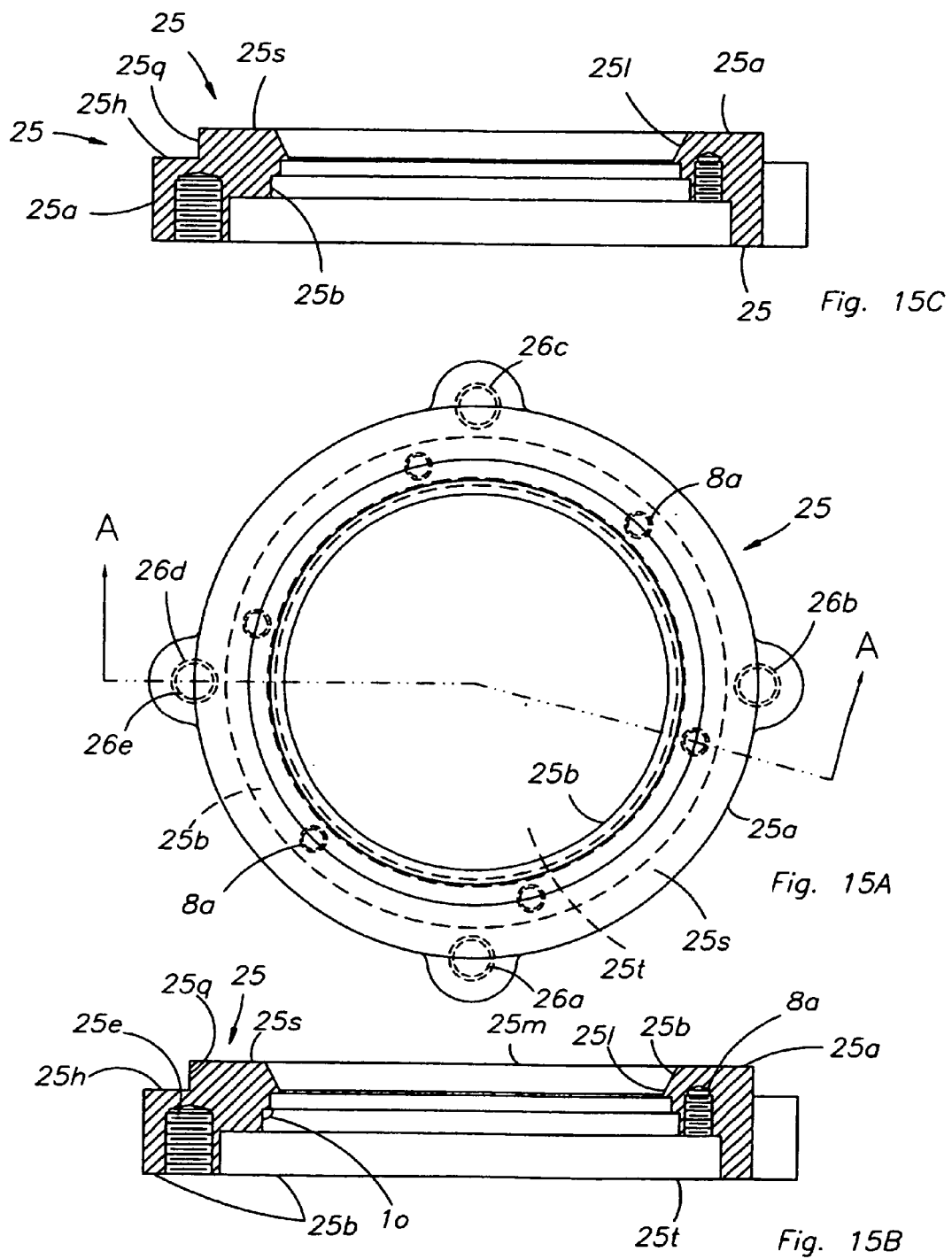

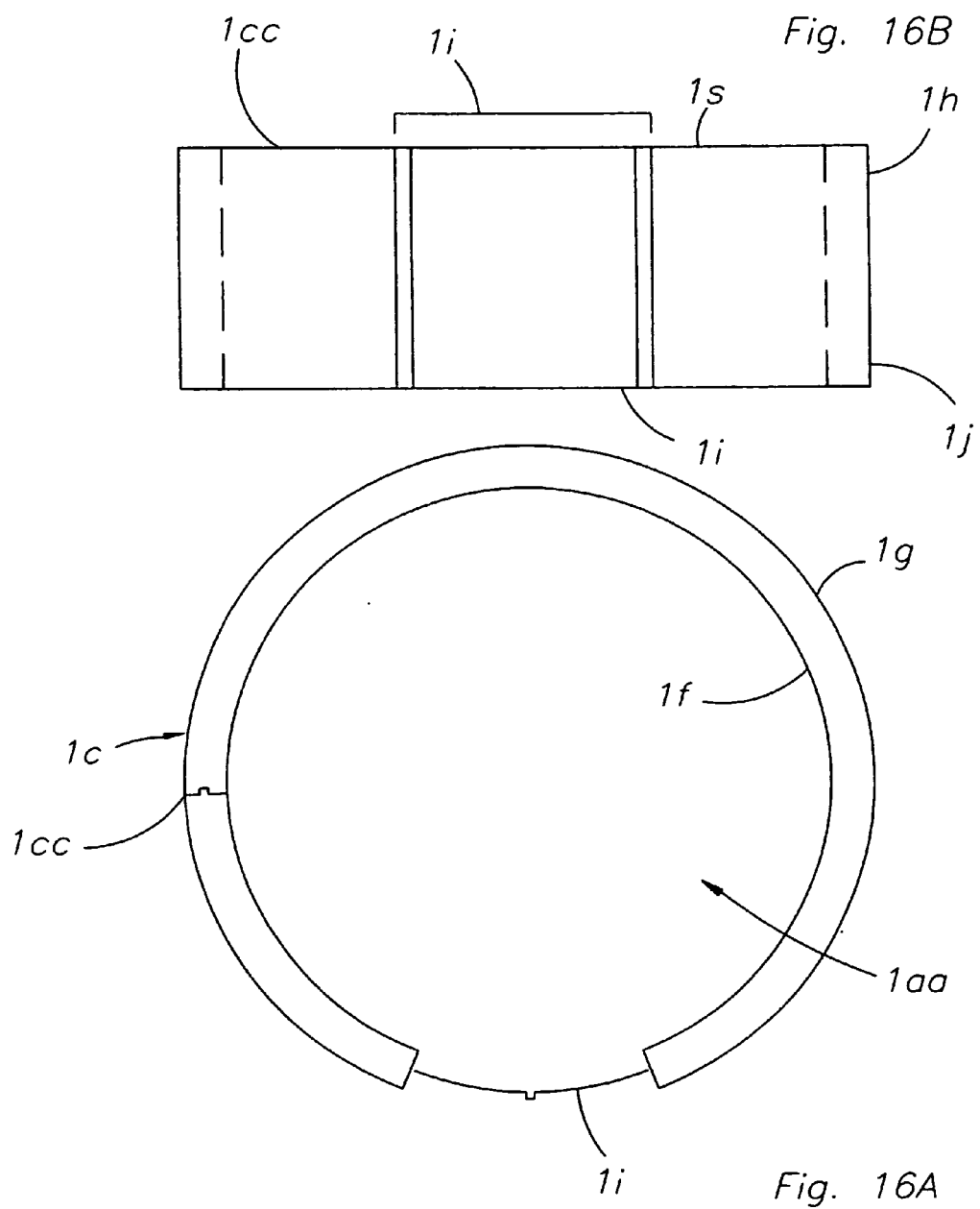

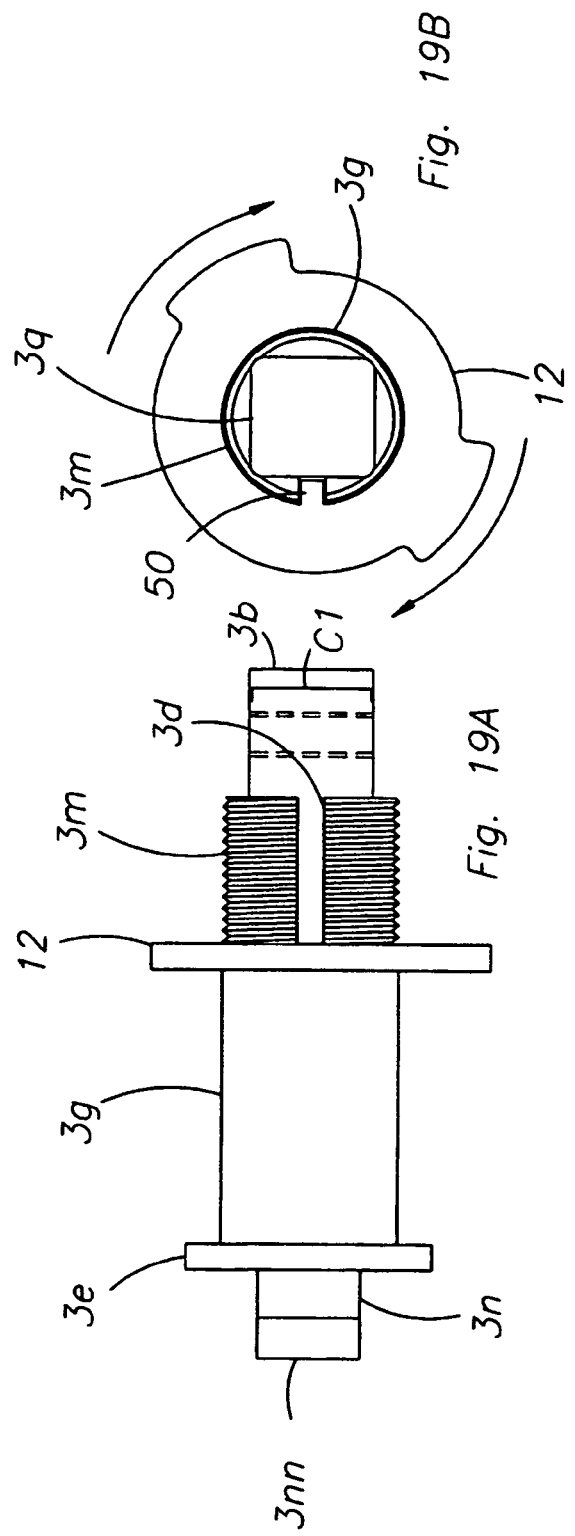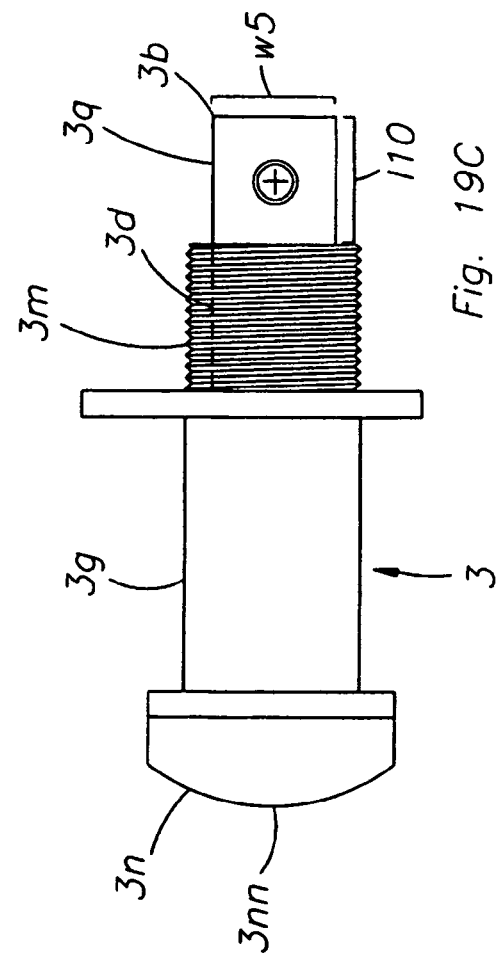

BALL VALVE ASSEMBLY

BACKGROUND OF THE INVENTION

The current invention is directed to ball valve assemblies that are configured to prevent leakage of liquids from within mobile tanks or other large tank-like containers. More particularly, but not exclusively, the current invention is directed to a ball valve assembly configured to prevent leakage of liquid commodities from railroad tank cars. Railroad tank cars that ship liquid commodities are generally divided into two categories: low pressure (general purpose) and (ii) high pressure tank cars. The present invention addresses general purpose tanks as (i) railroad cars that transfer these commodities from the tank cars (ii) through a valve located at the bottom center position of the tank ['bottom outlet valve']. These prior existing valves contain a variety of structures such as, but not exclusively, plug, butterfly or ball valves. The most common prototype is the ball valve, and most particularly this invention pertains to the ball valve variety.

Current ball valve design does not solve the problem of contamination of the commodity liquid. Contaminants such as, but not exclusively, tank scale, dirt and debris at the bottom of a typical commodity tank, abrade the valve ball component and thereby result in leakage. These current ball valves also do not solve the problem of corrosion of ball valve assembly components. Abrasive materials embed in (i) the valve seat and (ii) score valve ball components generally made of stainless steel. For example, scratching as well as other abrasive or corrosion damage to a conventional metal ball component creates small channels that inevitably cause leakage of the liquid commodity even when the ball valve assembly is ostensibly closed. To solve this problem, the current invention implements valve seats and valve balls generally made of a ceramic material, and more particularly a specific ceramic material. Ceramics are much harder materials than steel and not easily abraded by contaminants. They are also very resistant to corrosion by chemical liquid commodities carried in the tanks.

Midland currently produces bottom outlet ball valve Model No. 522 for railroad tank cars. Midland's valve contains (i) seats made of Teflon®/flouropolymer [TFE] or thermoplastic materials. Jamesbury produces a bottom outlet ball valve with a polytetrafluorocarbon [hereinafter 'PTFE'] valve seat for an effective seal between the ball component and the seat. Ball components are generally comprised of metal, particularly stainless steel, in the ball valve assembly industry. Unfortunately, TFE and PTFE seats are particularly susceptible to contaminants that embed in the seats and score the steel ball components.

To solve this problem the current invention implements a component designated as a ceramic wiper, and this ceramic wiper forms a rigid annular ring. When this ceramic wiper is combined with a ball component made of a ceramic material this wiper (i) substantially reduces scoring and corrosion of the ball component and (ii) prevents contaminants from accessing and embedding in the seats. The ceramic wiper is combined with a ceramic ball component to reduce abrasion of both these components. In sum, the current invention solves the industry leakage and corrosion problems with (i) the sealing capability of a soft valve seat and (ii) the durability of ceramic components.

In previously existing devices of this particular industry, TFE and PTFE are the most widely used material for ball assembly valve seats because of their cost efficiency. Polyether ether ketone [hereinafter PEEK] has excellent mechanical and chemical resistance at higher temperatures than PTFE. PEEK costs at least twice as much as PTFE, while the ceramic material in the current invention is more costly than PTFE but not cost prohibitive. The most preferred ceramic material for the current invention is zirconium oxide with preferably (i) tensile strength of 70-85 kpsi and (ii) thermal expansion coefficient of 5.9e-06 per degree Celsius. However, materials such as aluminum oxide compounds or silicon nitride are also satisfactory.

The current invention also solves the problem of handles which (i) pre-attach to a ball valve assembly and (ii) thereafter inadvertently swing open during transport of a liquid commodity. In the current art, whenever a tank car derails often the pre-attached valve assembly handle does not predictably shear and fall from the ball valve assembly; instead the protruding handle remains intact and attached to the bottom outlive valve at the railroad tank car bottommost surface. When the intact handle inadvertently swings opens during derailment, (i) the valve assembly automatically opens and (ii) the liquid commodity pours from the tank car with financial, business, and environmental consequences.

For example, Midland's bottom outlet ball valve comprises a large long handle that significantly protrudes from the valve assembly. www.midlandmfg.com/products/general-purpose-car/ball-valves on Apr. 8, 2013. In a similar manner Jamesbury, Inc. discloses a ball valve with a standard attached handle. Seehttp://www.valvesandinstruments.com/jamesbury-ball-valves. Both Midland and Jamesbury valve assemblies contains stems with male ends that solely and exclusively accommodate proprietary handles. Consequently ball valve assembly handles are not interchangeable with each other or other commercially available rotating operating devices. To solve this problem the design of the current invention contains a drive coupling to which conventional square drive tools can each operatively attach to the ball valve assembly.

In sum, the current invention solves the handle problem by insertion of the new drive coupling so loading personnel may implement a ubiquitous square drive tool to operate the ball valve assembly. In addition to this safety improvement, there is no additional sunk cost to implement and retrofit this drive coupling, because square drive tools are available at on loading and offloading railroad facilities. Furthermore, pending United States Department of Transportation regulations will require that all permanently affixed tools/handles be removed from bottom outlet valves. Consequently, the drive coupling of the current invention adaptor will solve the urgent need for compliance with these pending regulations.

A third advantage of the current invention is the stem packing assembly. The stem packing assembly provides a seal between (i) a rotating stem and (ii) the stationary valve assembly body. Currently available stem packing assemblies comprise many forms such as woven graphite material, woven TFE rope and numerous TFE chevron rings. These components insert into a stem longitudinal stem cavity between the rotating stem and valve assembly body. As the stem packing is increasingly compressed, the chevron rings (i) flare outward and (ii) thereby initially seal and contact the cylindrical wall of the longitudinal stem cavity and stem exterior wall surface.

In these prior existing stem packing assemblies, the stem packing is mechanically compressed when the ball valve assembly is initially assembled. This initial compression deflects the conventionally placed Bellville washers or wave washers whenever the ball valve assembly is initially installed within a tank car. However, there is a long-felt need to prolong the effective working life of the stem packing assembly: With long-term operation thereafter, this same stem packing with the currently available stem packing and spacers wears and inevitably creeps (by cold flow) away from the stem exterior surface. This process eventually reduces the effectiveness of the stem packing to seal between the stem and the valve body inner surface. Consequently, because of the rotating stem, wear of the stem packing requires progressive compression against the stem longitudinal cavity as time progresses.

The current solution to this problem is not sufficient to prevent leakage from the stem longitudinal cavity over time and rail car movement. For example, many manufacturers currently include chevron PTFE rings as (i) part of the ball valve assembly (ii) that is currently compressed by two spring loaded nuts with numerous supplementary components. For example a Jamesbury valve comprises an indicator stop, reinforcing ring, compression ring, compression plate, disc spring and flat washer in addition to several chevron rings. In this previously existing device, an applied force collectively compresses the compression plate and these numerous rings against the stem packing. In contrast, in the current invention, a single stem lock nut and an appropriate wave spring is threaded upon the stem. Single stem lock nut thereby forces a wave spring, stop indicator plate and packing spacer against the stem packing.

In this manner the current invention (i) reduces the number of stem assembly components from twelve components of the Jamesbury ball valve to two components (ii) by implementing a single spring loaded nut. In contrast, the Midland ball valve assembly implements a single locknut to seal a stem packing against the stem during manufacture. However in this prior art device there is no additional compression device to compensate for stem packing (i) cold flow and (ii) deterioration after this initial assembly and during subsequent movement of the tank during (iii) large temperature discrepancies.

The Jamesbury ball valve assembly implements a compression plate and several ring devices to compress the stem packing to the stem shaft. In particular, the Jamesbury valve also requires a first and second series of Bellville washers for additional compression. In contrast, in the current invention the stem packing is compressed along the stem by a single wave spring during initial manufacture process: This initial setting by the manufacturer conventionally applies 150 foot-pounds of torque to the stem lock nut. Thereafter the ball valve assembly is installed within the bottom surface of a tank car. The single wave spring provides sufficient additional compression of the stem packing during time and wear than conventional springs and previously existing stem packing assemblies.

Because of the rotating shaft, wear on the stem packing requires additional compression of the stem packing against the stem and the interior surface of the stem block as time progresses. Otherwise the stem packing will deteriorate within the stem bore and recede from the stem and the interior stem block surface, thereby reducing the sealing ability of the stem packing. Without additional spring force compressing the stem packing, the ball valve assembly is more susceptible to leakage along the valve stem longitudinal length over time. The current invention solves this problem with a single wave spring that (i) continuously compresses the stem packing to the stem and (ii) slows the wear of the stem packing. In the current invention, a single stem lock nut is also threaded upon the stem and constrained within the valve body.

This single stem lock nut forces the wave spring and packing spacer against the stem packing. Consequently the current invention comprises a new subassembly that includes the stem packing chevron rings, a single lock nut and a single wave spring for (i) reduction of stem packing components as well as (ii) an increased operating life of the stem packing materials. During its useful service period the stem packing wears and thereafter conforms to the annular cavity between the stem bore and the stem shaft, thereby reducing the sealing ability of the stem packing. Without additional spring force compressing the stem packing, the ball valve assembly is more susceptible to leakage along the valve stem longitudinal length. In sum, the stem packing assembly is a significant improvement because the presence of a single compression nut significantly reduces the number of necessary ball valve assembly components.

Consequently the current invention (i) reduces the number of packing components from twelve components of the Jamesbury ball valve to two components (ii) by implementing a single spring loaded nut along with the wave spring. The Midland ball valve assembly implements a single locknut to seal a stem packing against the stem; however, there is no additional compression device after this initial setting. The Jamesbury ball valve assembly implements a compression plate and several ring devices to compress the stem packing to the stem shaft. In particular, the Jamesbury prototype also requires a first and second series of Belville washers for additional compression. In sum, the stem packing assembly is a significant improvement because the presence of a single compression nut significantly reduces the number of necessary ball valve assembly components.

There are a variety of tank car bottom outlet flange configurations. However the majority of configurations contain (i) a six inch to eight inch orifice (ii) with eight tapped openings along a bolt circle with a diameter of approximately ten and five-eight inches. The flange sealing joint is either (i) an O-ring held within a groove or (ii) a tongue and groove with a gasket. The preferred sealing component is a tongue and groove application for the current invention. The ball valve assembly of the current invention and the Midland ball valve assembly need not be removed from the tank to replace or inspect the internal ball valve assembly components. However the Jamesbury valve assembly has an insert item on the top of the ball valve assembly by which the internal components are physically accessed only if the ball valve assembly is removed from the tank.

SUMMARY OF THE INVENTION

The current invention comprises an improved outlet ball valve assembly designed to (i) prevent leakage of a liquid from a mobile tank or other large tank-like container (ii) located within the bottom surface of a rail car tank or other large tank-like contain. The ball valve assembly is (i) configured and attached to the tank so the tank bottom opening within the tank bottom surface (ii) is continuous for liquid commodity flow through the tank bottom opening and e ball valve assembly (iii) whenever the ball valve assembly is in an open position.

The current invention more particularly comprises an improved bottom outlet ball valve assembly configured to prevent (i) abrasion of valve assembly components from interior tank commodity contaminants and (ii) damage from corrosive degradation. The improved ball valve assembly also comprises solutions for (i) a universal drive coupling (ii) an improved ball component with a single ceramic wiper (iii) improved sealing by stem packing (iii) reduction of stem packing assembly components by implementing a single wave spring and longitudinal stem groove and (iv)

diminished leakage by positioning an O-ring between the ceramic wiper and the body tube of the ball valve assembly.

The current improved bottom outlet ball valve assembly significantly reduces leakage by implementing (i) an annular rigid ceramic wiper, (ii) a ceramic ball component, and both of which resist scoring, abrasion and chemical exposure corrosion. The ball valve assembly housing preferably comprises metal and most preferably carbon steel or stainless steel. The ball component for the current ball valve assembly consists entirely and solely of a ceramic material. Most preferably the ball component ceramic material is made entirely of zirconium oxide, but materials such as aluminum oxide compounds or silicon nitride are also satisfactory. The most preferred zirconium oxide is also the most cost-effective material for the properties it exhibits.

The ball valve assembly body contains additional new or modified components such as but not exclusively: wave spring, ceramic wiper, and ceramic ball component, drive coupling and stem packing assembly. Seat retainers are preferably (i) made of carbon steel or stainless steel, and (ii) exhibit a fine finish to better contact the ball component surface. The seat retainer is preferably bolted to the lower surface of the valve body with cap screws. The seat retainer applies mechanical pressure to the bottom seat against the ball component, thereby creating a leak tight seal.

The stem is (i) preferably made of stainless steel although more corrosion resistant metals are also satisfactory and (ii) housed within the single body tube. The body tube the ball valve assembly comprises a body tube lateral opening into which the stem is inserted and contained within a stem block. This body tube opening continuously (i) comprises an opening from the exterior surface of the body tube that (ii) simultaneously opens into the interior of the body tube, where (iii) the interior of the body tube contains the single ball component. The stem (ii) translates the rotation of the opening device, such as handle and adaptor infra, to the ball component within the valve body. The ball component is (i) housed within the valve body (ii) and is preferably comprised of a ceramic material harder than stainless steel. For example, the Vickers hardness measurement for stainless steel is 129, while that measurement is 1150 for zirconium oxide. Similarly, the Knoop hardness for stainless steel is 138, while the analogous measurement for zirconium oxide is 1035. The most preferred material is zirconium oxide.

In the current invention, the ball component is vented to prevent liquid entrapment within the valve body, while the ceramic material prevents abrasion of the ball component. The vented ball component does not allow pressure from a liquid commodity to increase between itself and body tube interior, and which liquid may deform PTFE valve assembly seats [hereinafter 'seats']. This deformation occurs in the previously existing devices because back pressure posterior to the ball component can dislodge the seats, infra in a downstream direction.

The top seat of the ball valve assembly (i) is housed within the valve body (ii) preferably made of PTFE and (ii) sits within the upper body seat cavity. The top seat is designed to (i) prevent leaks of debris, contaminants and the liquid commodity, and (ii) thereby effectively form a mechanical seal between the ball component, valve body and ceramic wiper. The bottom seat is also preferably (i) made of PTFE (ii) sits within the lower seat retainer, and (iii) thereby prevents leaks by creating a tight mechanical seal between the ball and seat retainer.

The ceramic wiper preferably comprises the same ceramic material as the ball component supra. The ceramic wiper is annular in shape and the interior surface of the wiper has the same radius as the ball component. This ceramic wiper interior surface effectively (i) creates a mechanical joint with the exterior surface of the ball component (ii) that prevents contaminant particles from entering the interior of the body tube containing the two PTFE seats. In sum, the ceramic wiper sits within the upper body seat cavity where it (i) mechanically seals against the ball component and (ii) prevents contaminants from embedding within, scoring, corroding or otherwise abrading the single top and single bottom seats respectively.

Cap screws are preferably made of steel and mechanically attach the seat retainer to the valve body. There are also two O-rings made of a conventional off the shelf elastomeric material and flouroelastomers. For example when the liquid commodity is ethanol then ethylene propylene diene monomer is the preferred O-ring material. On the other hand, if while if the liquid commodity is crude oil, then a fluorocarbon is the most preferred O-ring material. There is preferably a single upper O-ring located in the upstream portion of the ball valve assembly between the ceramic wiper and the valve body. The bottom O-ring is located in the downstream portion of the ball valve assembly between the lower seat retainer and the valve body. The upper O-ring prevents fluid from passing between the horizontal mating surfaces of the ceramic wiper and valve body. The downstream O-ring (i) is located in an annular groove created between the valve body and seat retainer and (ii) creates a mechanical seal between the valve body and seat retainer. In the current invention O-rings are also round in cross-section.

A thrust washer preferably made of PTFE significantly reduces friction at the interface between the valve body and stem collar in a manner well known in this particular valve industry. The stop pin, preferably made of steel, allows for a maximum 90 degrees rotation of the ball component (i) within valve body and (ii) between the fully open or closed position of the ball valve assembly. The stop indicator plate preferably made of steel, slides onto the threaded portion of the stem shaft. The stop indicator plate is held rigidly by the square tab upon the plate within the stem's horizontal aligned groove.

The current invention also comprises a wave spring, preferably made of steel, and this wave spring is positioned between the stem lock nut and stop indicator plate. The wave spring provides additional mechanical compression of the stem packing, in addition to the mechanical compression of the attached stem lock nut. The stem lock nut, also preferably made from steel, provides initial and interim compression of the stem packing and retains the stem within the valve.

In the current invention the stem packing preferably (i) comprises a bottom packing ring and/or a top packing ring and (ii) is made of PTFE. Between these two rings the stem packing also contains several intermediate chevrons (U-shaped pattern) PTFE rings that provide a leak tight seal between the stem block and the stem. The packing spacer, preferably made of steel, translates compressive force between the stem lock nut and stem packing into rotational force to move the ball component between a closed or open position. A stem packing assembly is thereby improved because of the single compression nut that results in a reduction of stem packing components. With the new stem packing assembly design of the current invention a single stem lock nut, thread upon the stem, forces a single wave spring and packing spacer against the stem packing.

In the preferred embodiment the current invention comprises a drive coupling that is preferably made of steel with (i) the mechanical connection to the ball component within the ball valve assembly to (ii) a previously existing square male valve operating device. This operating device rotates the ball component of the ball valve assembly to an open and shut position. The conventional square male valve operating device may be, but not exclusively, three-quarters or one-inch square drive tool, ratchet, torque wrench, flex head handle, slinging t-handle or bull handle. The drive coupling of the current invention is preferably three-quarters inch in square cross section perpendicular to the longitudinal axis of the drive coupling. With few exceptions, this drive coupling square drive comprises a universal retrofit to square drive tools and (i) is sufficiently thick in wall thickness so that it does not fracture upon application of considerable sudden torque, sustained torque, or other twisting forces. The drive coupling may also be used for valve assembly handles that are created or produced in the future.

The current drive coupling thereby eliminates the pre-attached handle with its a strong tendency to (i) swing away from the rail car and (ii) become a safety hazard if it does not otherwise shear from the tank car. In addition to this safety hazard, the invention adaptor eliminates the cost for purchase of ball valve assembly handles that are proprietary to the handle manufacturer. Pending United States Department of Transportation require the complete removal of operating handles during transit, so the current drive coupling fills an urgent and long felt need in this industry.

It is therefore a purpose of the present invention to create a ceramic wiper which prevents contaminants from abrading the seats of the interior of the ball valve assembly.

It is another purpose of the present invention to create a stem assembly that (i) more efficiently compresses the packing material to the stem and stem bore and (ii) thereby prevents leakage with fewer stem assembly components It is another purpose of the present invention to (i) provide a drive coupling that attaches to the valve assembly stem and (ii) retrofits conventional readily available tools, instead of custom handles, by which to open and close the ball valve assembly.

It is another purpose of the current invention to provide a rail car tank bottom fitting ball valve assembly that (i) is economical to purchase (ii) prevents leaks due to wear along the stem (iii) prevents leaks due to abrasion of valve components by tank car contaminants and (iv) prevents leaks due to chemical corrosion of the valve components.

These and other improvements will become increasingly apparent from the attached drawings and the detailed description of the preferred embodiment and other embodiments.

BRIEF DESCRIPTION OF THE DRAWINGS

FIG. 1AA is a lateral view of the intact preferred embodiment of FIG. 1A.

FIG. 1BB illustrates an anterior sectional view of the preferred embodiment of FIG. 1 A attached to a bottom surface of a rail tank car.

FIG. 5A illustrates an isolated proximal end view of the drive coupling for the ball valve assembly of FIGS. 1A, 1AA.

FIG. 5B illustrates an isolated lateral view of the drive coupling for the ball valve assembly of FIGS. 1A, 1AA.

FIG. 5C is an isolated distal view of the drive coupling for the ball valve assembly of FIGS. 1A, 1AA.

FIG. 9A illustrates an isolated upper plan view of the stem of the ball valve assembly of FIG. 2.

FIG. 9B illustrates an isolated distal view of the stem of the ball valve assembly of FIG. 2.

FIG. 9C illustrates an isolated lateral view of the stem of the ball valve assembly of FIG. 9A rotated 90 degrees.

FIG. 10A illustrates the valve body of FIG. 10B along line A-A.

FIG. 10B illustrates the lateral view of the valve body of the ball valve assembly.

FIG. 10C illustrates the bottom view for the valve body of FIG. 10B.

FIG. 13A illustrates an isolated lateral view of the stem block of the ball valve assembly of FIG. 2.

FIG. 13B illustrates a view of the stem block along line C-C of FIG. 13A.

FIG. 13C illustrates an isolated distal view of the stem block of the ball valve assembly of FIG. 2.

FIG. 15A illustrates an upper plan view of the bottom flange for the valve body for the ball valve assembly of FIG. 2.

FIG. 15B is a sectional view along the first segment of line A-A through FIG. 15A.

FIG. 15C is a sectional view along the second segment of line A-A through FIG. 15A.

FIG. 16A is an upper plan view of the body tube of the ball valve assembly of FIG. 2.

FIG. 16B is a view of the body tube of the ball valve assembly of FIG. 2 through the single body tube lateral opening.

FIG. 19A is an isolated lateral view of the stem and stop indicator plate of the ball valve assembly of FIG. 2.

FIG. 19B is an isolated proximal view of the stem and stop indicator plate of FIG. 19A.

FIG. 19C is an isolated enlarged view of the stem and stop indicator plate of FIG. 19A rotated 90 degrees.

DETAILED DESCRIPTION OF THE PREFERRED EMBODIMENT AND OTHER EMBODIMENTS

The Preferred Embodiment of Improved Ball Valve Assembly 100

A. Valve body 1

1. Body Tube 1c

Figure 1A:
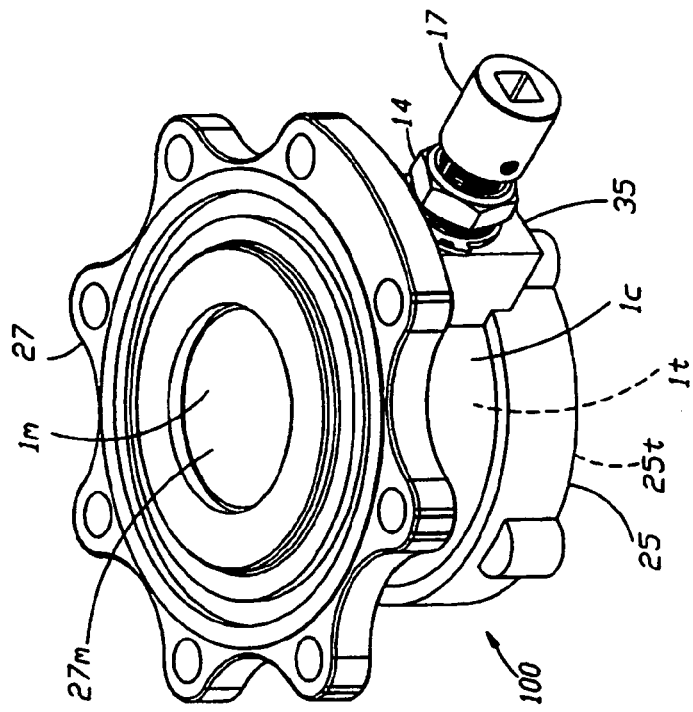
FIG. 1A illustrates a partial perspective anterior view of the intact preferred embodiment of the improved ball valve assembly.
Figure 1A:
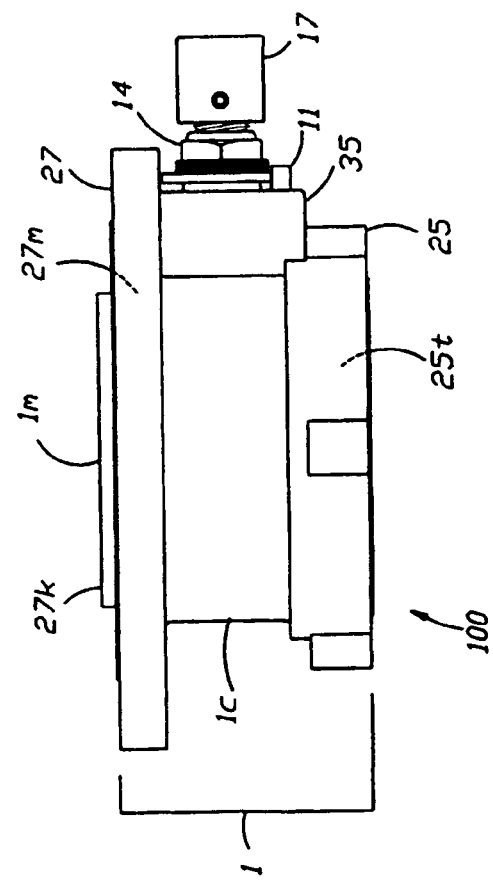

Referring initially to FIGS. 1A, 1AA, 1B and 1BB, in the preferred embodiment the improved tank bottom outlet ball valve assembly 100 [hereinafter ball valve assembly 100] comprises a single sole and only valve body 1. Valve body 1 is preferably made of steel and attaches to bottom surface 300a of rail car tank 300 or other tank-like container. Valve body 1 can be cast as a single object or otherwise fabricated and assembled; welding 41 is one example in the preferred embodiment. welding as one example. Valve body 1 is preferably approximately (i) 12.25 inches in total maximum longitudinal length 1 and (ii) 54.41 inches in maximum diameter. Valve body 1 comprises a single top flange 27, single bottom flange 25, and single body tube 1c.

Referring to FIGS. 1A, 1AA, 1B, 1BB, 10A, 10B and 10C, 16A and 16B, body tube 1c comprises a (i) body tube interior surface 1f and an exterior body tube surface 1g (ii) as well as a body tube wall thickness 1cc and (iii) is substantially cylindrical in configuration Body tube 1c has a single upper body portion 1h as well as a single lower body portion 1j. Valve body 1 preferably attaches to rail car flange 300a with bolts 43 in a manner well known in this particular industry. Please see FIGS. 1B, 1Bb and infra. Body tube wall 1cc (i) is preferably 0.44 inch in thickness and (ii) comprises a single lateral body tube opening 1i. Single lateral body tube opening 1i preferably has a 0.44 radius of body tube wall 1cc. Single lateral body tube opening 1i provides access to enclosed ball component 4 by stem 3 through stem block 35.

Body tube 1c also comprises a (i) single body tube circular uppermost opening 1m and (ii) single body tube circular lowermost opening 1t. Body tube circular openings 1m, 1t congruently and concentrically align with (i) each other (ii) upper and lower flange openings 27m, 25t respectively and (ii) rail car orifice 300e (iii) within rail car bottom side 300a when ball valve assembly is properly assembled and installed upon railroad tank car 300. When ball valve assembly 100 is properly assembled and attached to rail car bottom side 300a (i) rail car orifice 300e (ii) top and bottom flange circular openings 27m, 25t (iii) body tube circular openings 1m, 1n and (iv) ball component bore 4a form a continuous channel for liquid commodity 200 whenever ball valve assembly 100 is in an open position and configuration.

2. Top Flange 27

Referring to FIGS. 1A, 1AA, 1B, 10A, 10B 10C, 14A and 14B, top flange 27 is preferably welded to body tube 1c at the upper circle body tube edge1s. However in other embodiments all components of valve assembly 100 are cast as a single integral metal piece. Top flange 27 preferably is made of stainless steel and comprises a finished exterior surface 27a that is machined to a 125 RMS (where "root means square" defines the roughness of a surface). Top flange 27 is preferably (i) 4.096 inches in minimum interior diameter (ii) twelve and one-quarter inches in maximum exterior diameter (iii) 0.938 inch in minimum thickness and (iv) 0.964 inch in maximum thickness. Top flange 27 comprises centrally positioned top flange opening 27m.

3. Bottom Flange 25

Referring to FIGS. 1A, 1AA, 1B, 10A, 10B, 10C, 15A, 15B and 15C, bottom flange 25 preferably is made of stainless steel and comprises a finished exterior surface 25a machined to a 125 RMS. Bottom flange 25 can be (i) an integral portion of valve body 1 or (ii) welded to body tube 1c by weld 41 in a manner well known in this industry. Bottom flange 25 is preferably approximately (i) 6.89 inches in maximum inner diameter (ii) 5.90 inches in minimum interior diameter and (iii) 7.75 inches in maximum exterior diameter. Bottom flange (i) has a single centrally positioned bottom flange opening 25t (ii) that concentrically and congruently aligns with upper flange circular opening 27m as well as body tube circular openings 1m, 1t.

B. Lower Seat Retainer 2

Figure 1B:
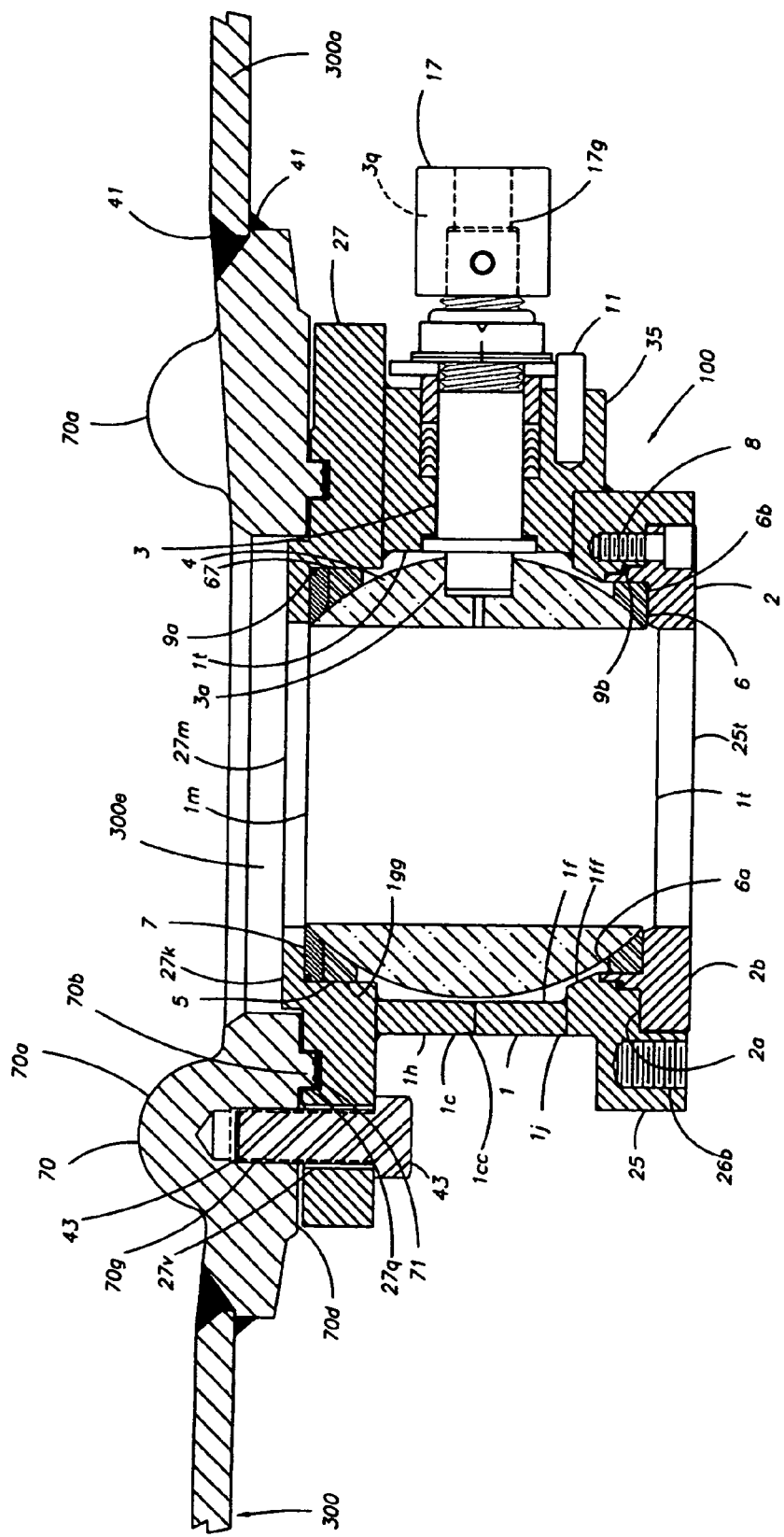
FIG. 1B is an anterior view of the preferred embodiment of FIG. 1A attached to the bottom surface of a rail tank car.

Referring to FIGS. 1BB, 2, 3, 4C, 4D, 12A and 12B, lower seat retainer 2 statically presses upon bottom seat 6 to (i) mechanically create a seal against leakage of liquid commodity 200 when ball valve assembly 100 attaches to railroad tank car 300 or other container 300b. Lower seat retainer is positioned between and among ball component 4, bottom seat 6 and body tube interior surface 1f. Lower seat retainer 2 comprises a single (i) maximum exterior retainer diameter 2d and (ii) maximum inner retainer diameter 2e. Lower seat retainer 2 is annular and is preferably (i) four inches in minimum interior diameter (ii) 5.29 inches in maximum inner diameter (iii) 6.87 inches in maximum exterior diameter and (iv) 1.20 inches in maximum height. Lower seat retainer 2 has an upper retainer surface 2a and a lower retainer surface 2b.

Figure 12A:
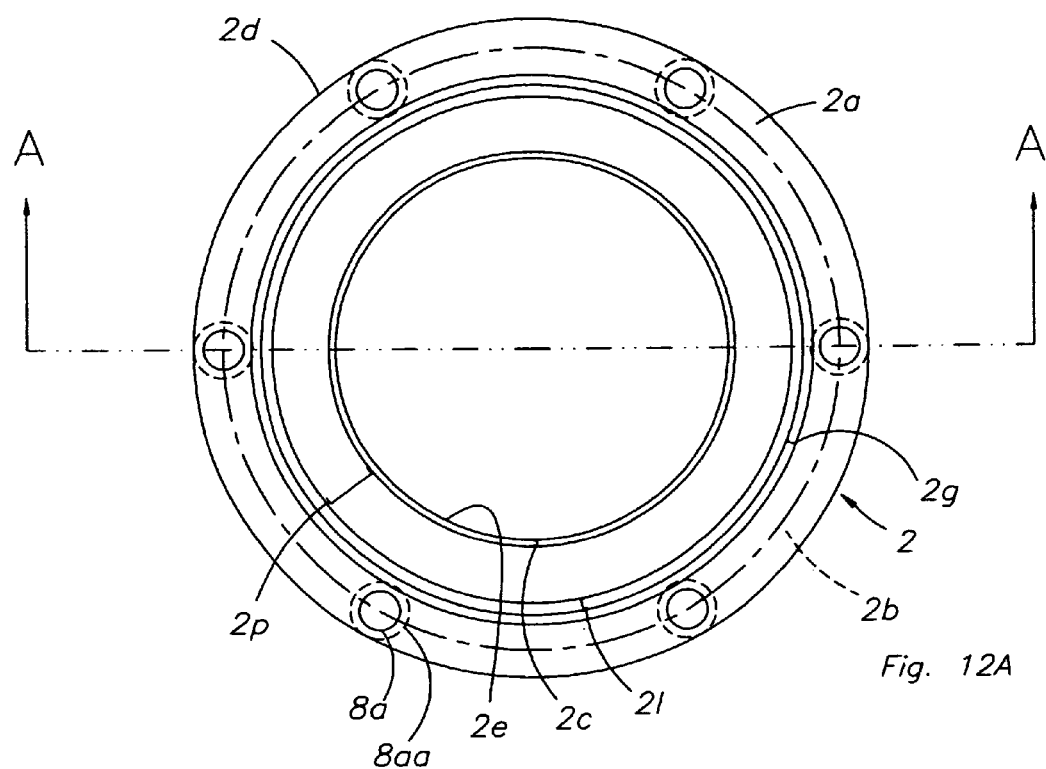
FIG. 12A illustrates an isolated upper plan view of the seat retainer of the ball valve assembly of FIG. 2.
Figure 12B:
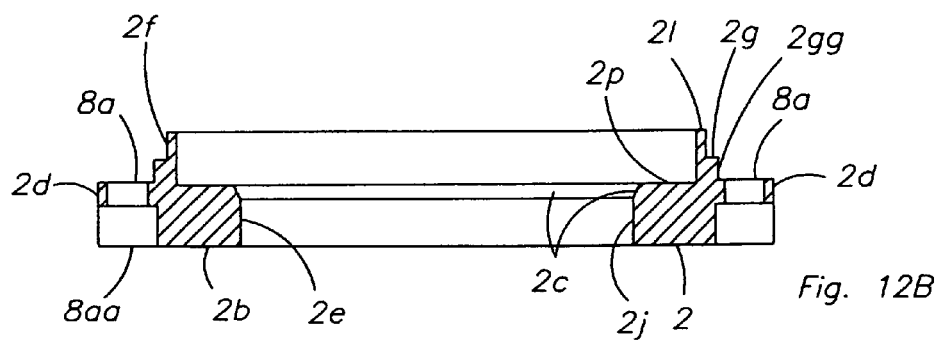
FIG. 12B illustrates a sectional view along line A-A of FIG. 12A.
Figure 14A:
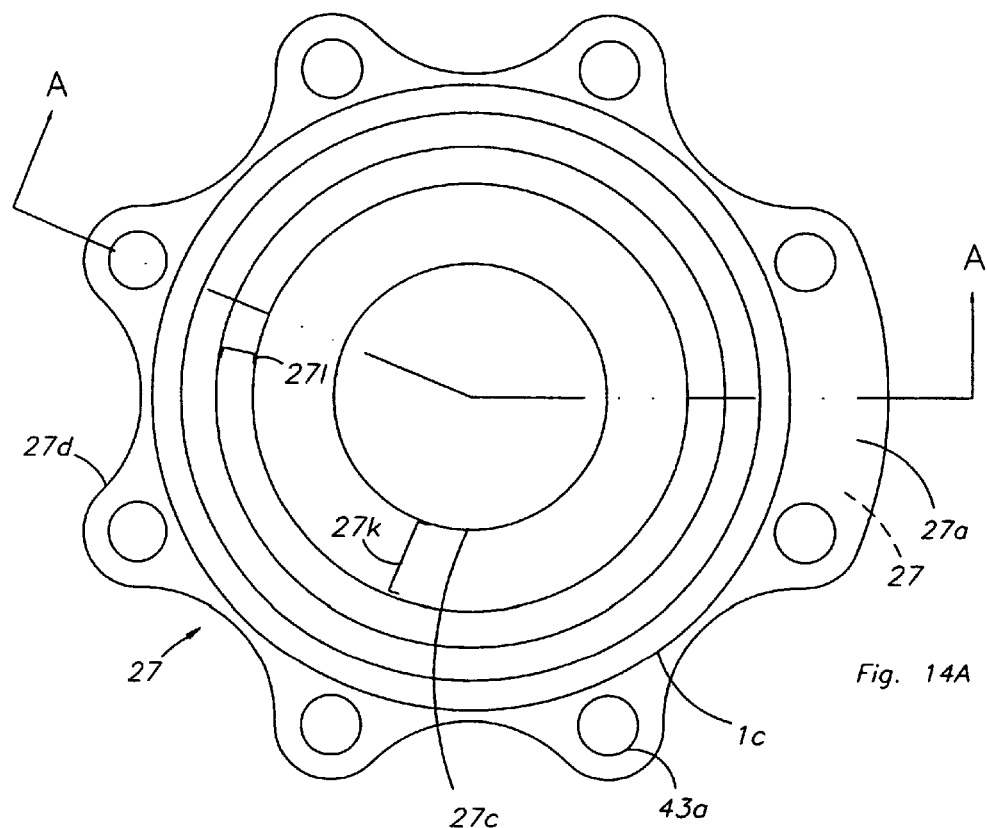
FIG. 14A illustrates an isolated upper plan view of the top flange of the ball valve assembly of FIGS. 1A, 1AA and 2.
Figure 14B:
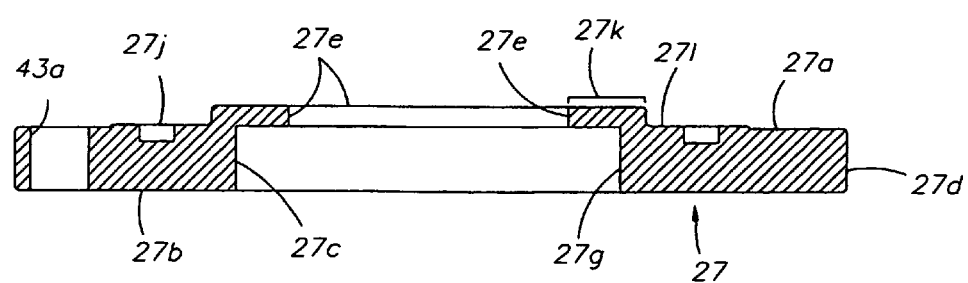
FIG. 14B illustrates a sectional view along line A-A of FIG. 14A.

As best seen in FIG. 12B, lower seat retainer 2 comprises a seat retainer chamfer 2c (curved bevel) of (i) preferably 25 degrees along a perpendicular cross sectional line through lower seat retainer 2 and (ii) with a 0.03 radius that (i) flares upward and outward from seat retainer interior surface 2e. Chamfer 2c of seat retainer lower surface 2b provides a sufficient clearance for ball component 4 to rotate in a manner well known in this particular industry. Referring to FIG. 1BB, lower seat retainer 2 (i) continuously contacts lower body tube interior surface 1*ff* and (ii) is preferably machined from stainless steel and (iii) preferably comprises a serrated spiral finish. Lower seat retainer 2 preferably attaches to valve body 1 with six to eight socket head cap screw 8 within aligned cap screw counter-bore aperture 8*a* and 8*aa*. Socket head cap screws 8 are (i) preferably made of steel and (ii) equidistantly spaced from each other in a circular configuration. Lower seat retainer 2 is also shaped to reversibly and mechanically receive lower surface 6*b* of bottom seat 6 in a flush configuration.

Figure 11A:
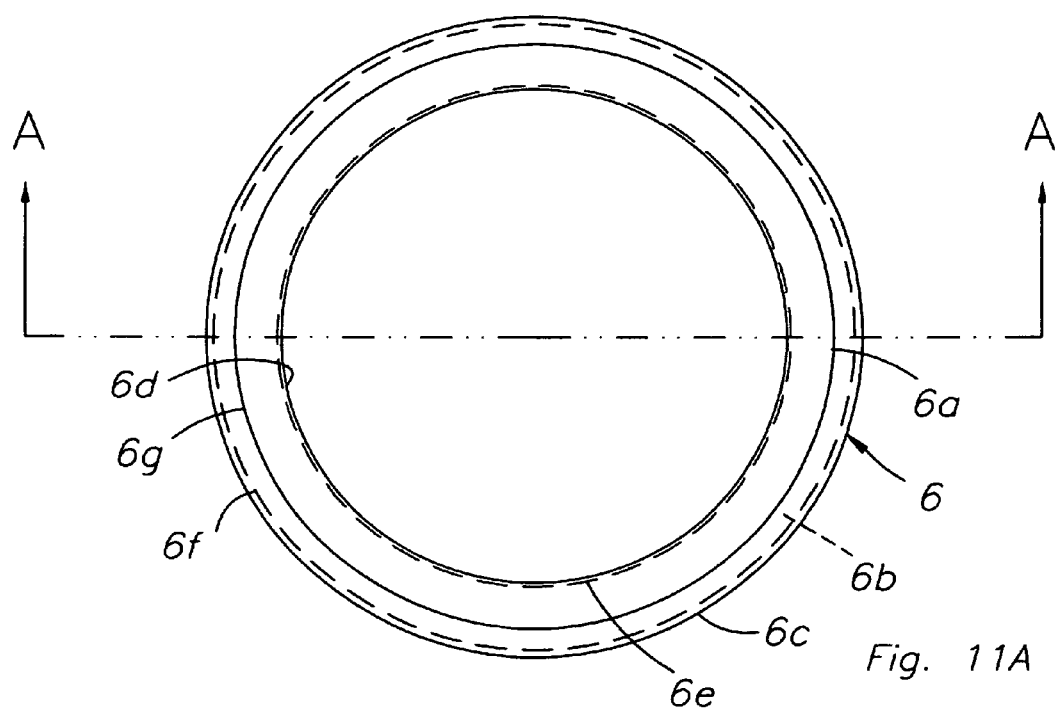
FIG. 11A illustrates an upper plan view of an isolated bottom seat of the ball valve assembly of FIG. 2.
Figure 11B:
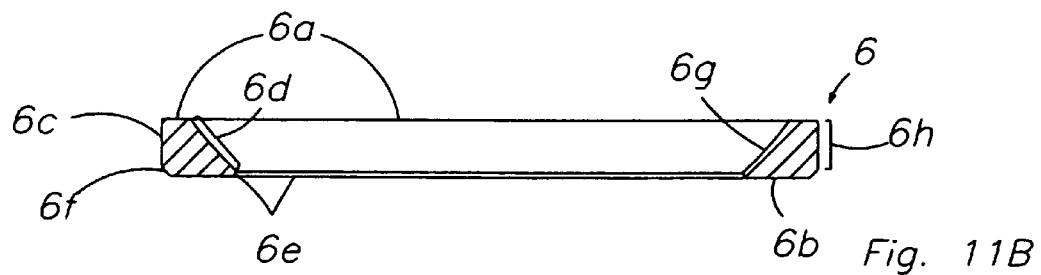
FIG. 11B illustrates the sectional view along line A-A of the bottom seat of FIG. 11A.

C. Bottom Seat 6 Referring to FIGS. 1BB, 2, 3, 4C, 11A, 11B, and 18, bottom seat 6 (i) is preferably made of PTFE (ii) is positioned between seat retainer 2 and ball component 4 infra and (iii) creates a mechanical barrier to leakage of fluid commodity 200 between ball component 4 and seat retainer 2. Bottom seat 6 comprises an upper surface 6*a* and a bottom surface 6*b*, an exterior surface 6*c* and an anterior surface 6*d*. Bottom seat 6 is annular in structure and is preferably approximately (i) 4.829 inches in maximum inner diameter (ii) 4.081 inches in minimum interior diameter (iii) 5.280 inches in maximum exterior diameter and (iv) 0.450 inch in maximum height 6*h*. Bottom seat inner surface 6*d* comprises an outwardly flaring bevel 6*g* from bottom surface 6*b* at preferably approximately 48 degrees from a perpendicular cross-sectional line through bottom seat 6 of FIG. 11A.

Bottom seat 6 also comprises a single small seat notch 6*f* at the intersection of exterior bottom seat surface 6*c* and bottom seat surface 6*b*. Notch 6*f* allows bottom seat surfaces 6*c*, 6*b* to seal against seat retainer 2 when the seat retainer 2 does not contain perfect corners. Bottom seat exterior surface 6*c* is continuously flush with body tube interior surface 1*f*. Bottom seat 6 preferably comprises (i) a continuously smooth exterior surface 6*c* without grooves, other indentations or other structural features so (ii) bottom seat 6 more effectively maintains continuous flush contact with seat retainer interior surface 2*f*.

D. Ball Component 4

Referring to FIGS. 1BB, 2, 3, 4, 8A and 8B, continuously contacting body tube interior surface 1*f*, bottom seat 6 and upper seat 5 is ball component 4. Ball component 4 is made of a ceramic material 4*f*, most preferably zirconium oxide although zinc oxide and aluminum oxide are also satisfactory. The first and second most preferred zirconium oxide materials 4*ff*, 4*fff* respectively are each five to seven times harder than stainless steel. The first most preferred zirconium oxide material 4*ff* also exhibits the following mechanical properties: Hardness HV5 (Vickers) 1650 kg/mm2; tensile strength 70 kpsi and; thermal expansion 25-200C 8.50E-06. The second most preferred zirconium oxide material 4*fff* exhibits the following mechanical properties: HardnessHV5 1150 kg/mm2; tensile strength 85 kpsi and; thermal expansion 25-200C 9.90E-06.

Ball component 4 is preferably six inches in diameter. Ball component 4 has a single continuous ball cylindrical bore 4*a* that is preferably (i) positioned along a ball longitudinal line 4*e* through the center of ball component 4 and (ii) four inches in diameter. Ball cylindrical bore 4*a* is continuous and (i) opens outwardly along exterior Ball surface 4*d* at first and second ball openings 4*x*, 4*y* respectively and (ii) ball openings 4*x*, 4*y* are preferably 180 degrees apart from each other. In an open position, ball openings 4*x*, 4*y* (i) congruently and concentrically align with aligned flange openings 27*m*, 25*t*, body tube openings 1*m*, 1*t* and railroad tank car orifice 300*e*(ii) when ball valve assembly 100 is properly assembled and attached to lower railroad car tank surface 300*a*. In this configuration ball cylindrical bore 4*a* is the channel through which liquid commodity 200[not seen] flows whenever ball valve assembly 100 is open.

Figure 4A:
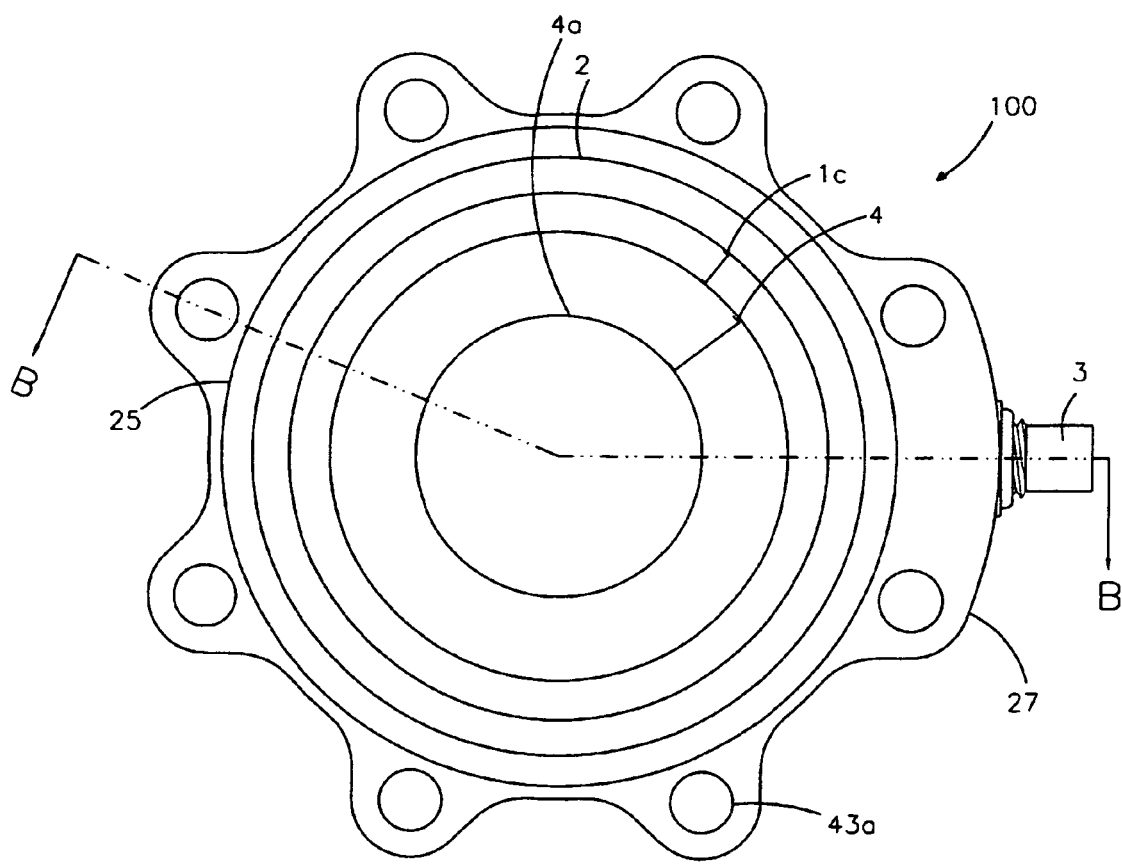
FIG. 4A illustrates a top plan view of the ball valve assembly without a drive coupling.
Figure 4B:
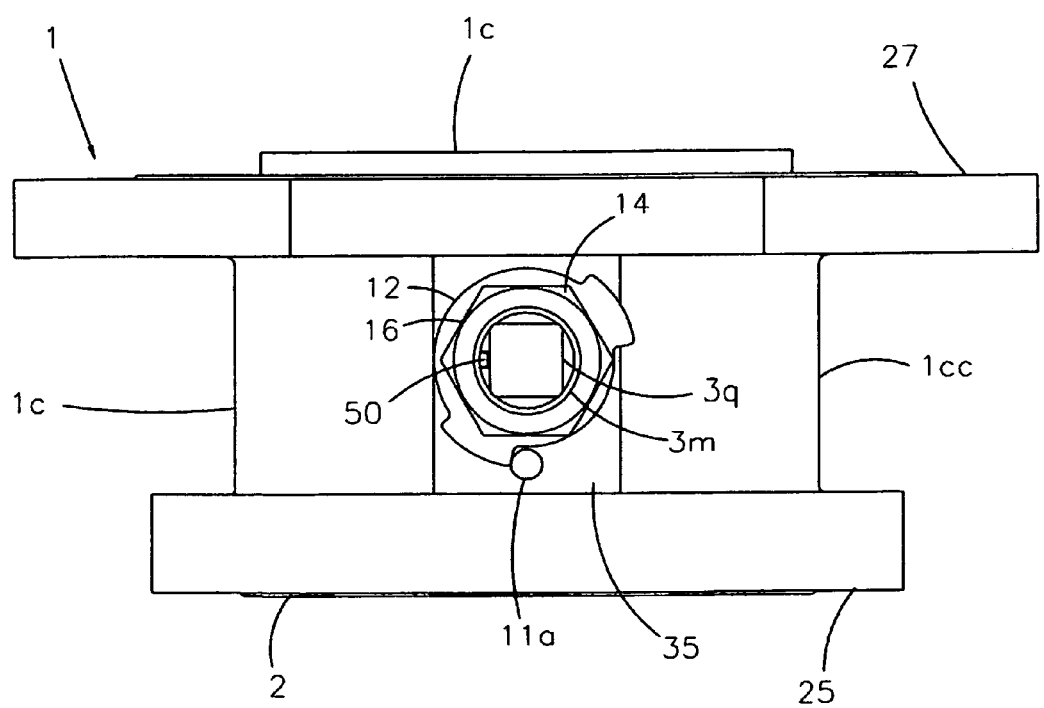
FIG. 4B illustrates a distal lateral view of the ball valve assembly without a drive coupling.
Figure 4C:
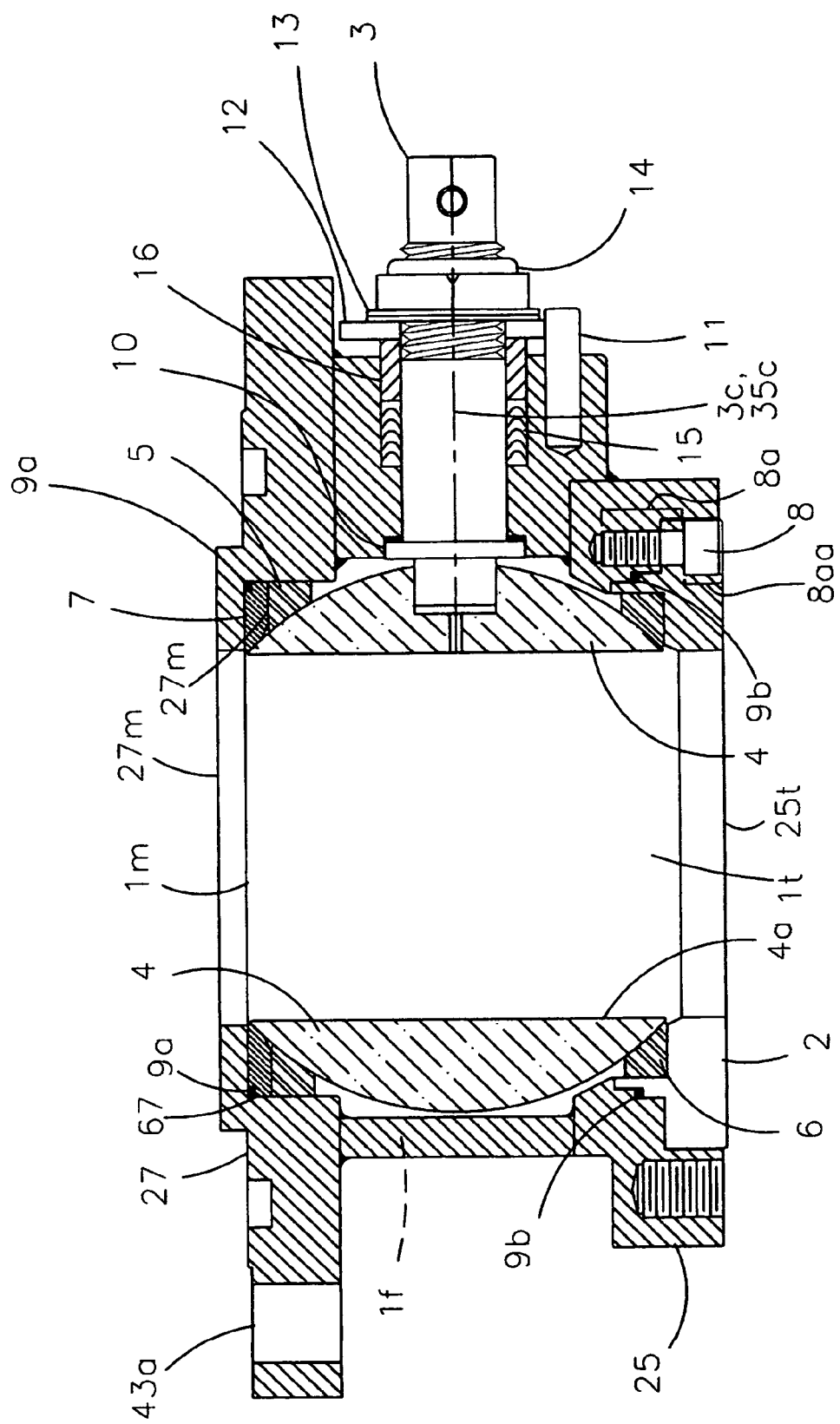
FIG. 4C illustrates a sectional view along line B-B of FIG. 4A.
Figure 4D:
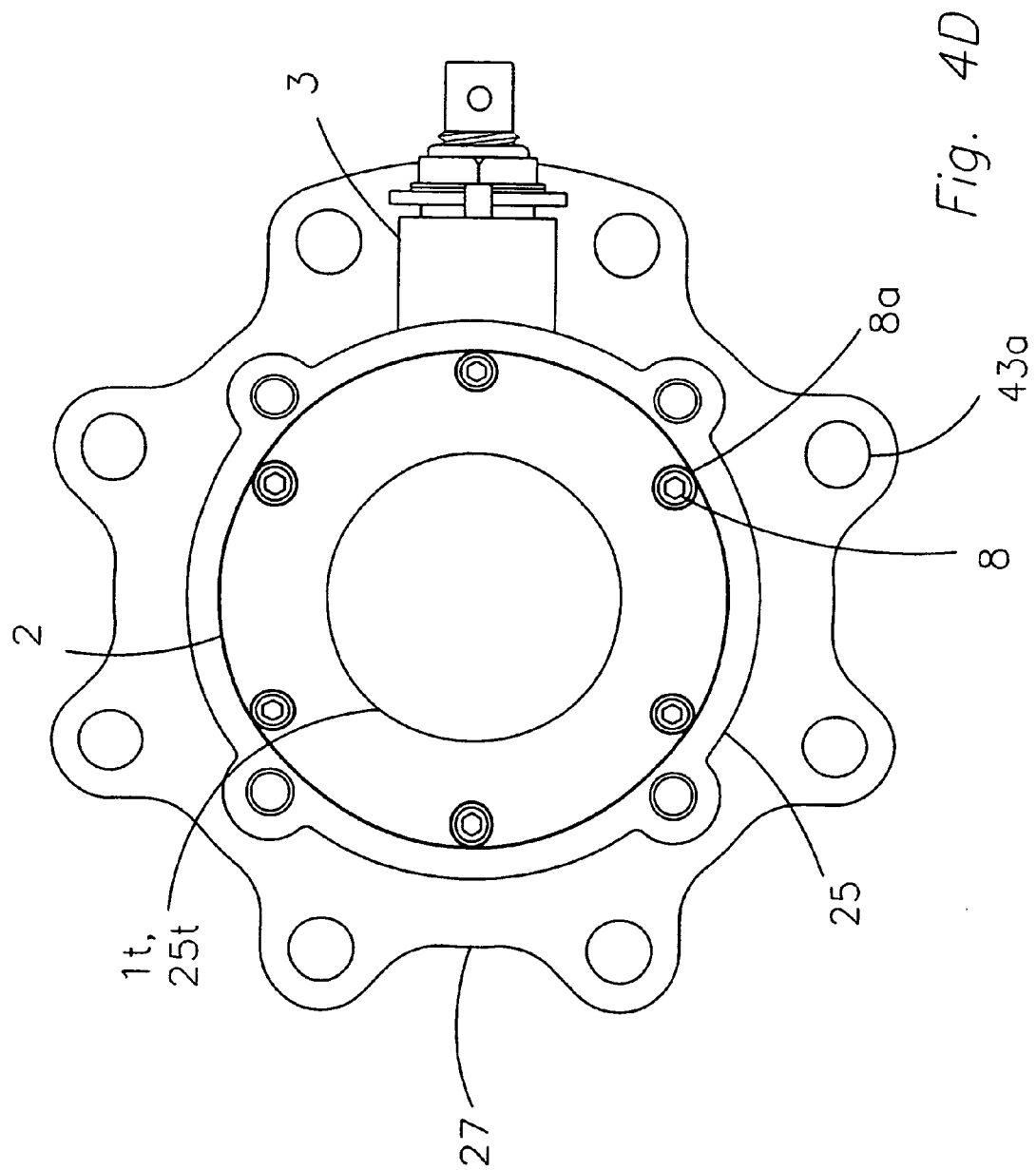
FIG. 4D illustrates the bottom plan view of the ball valve assembly of FIGS. 1A, 1AA.
Figure 8A:
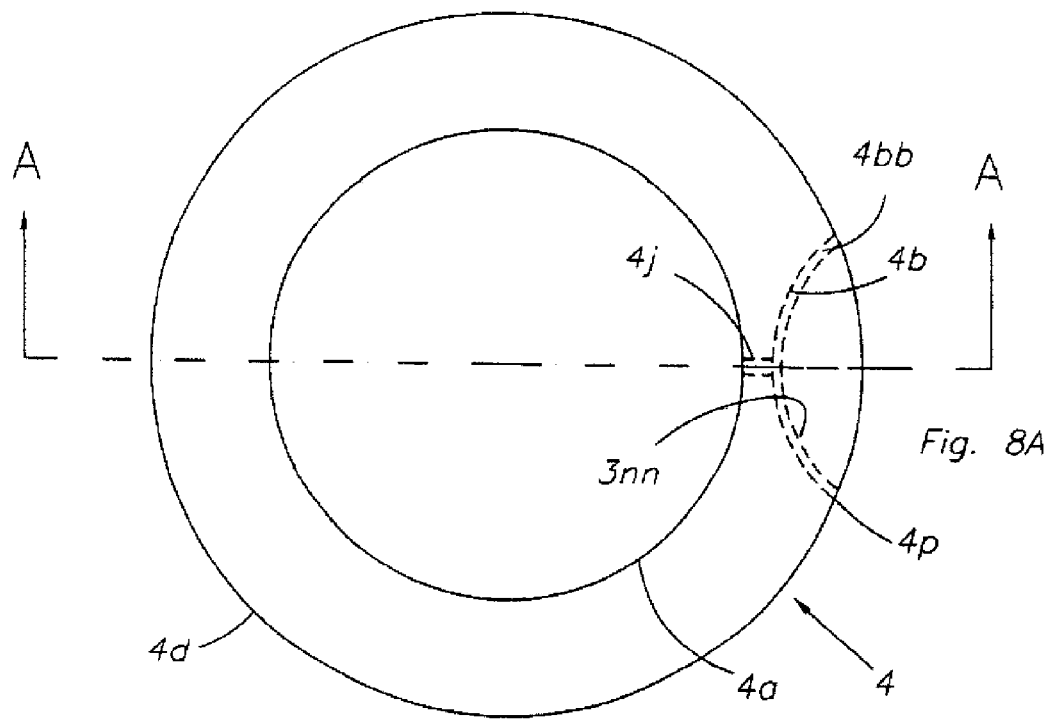
FIG. 8A illustrates an isolated upper plan view of the ball component of the preferred ball valve assembly of FIGS. 1A, 1AA and 2.
Figure 8B:
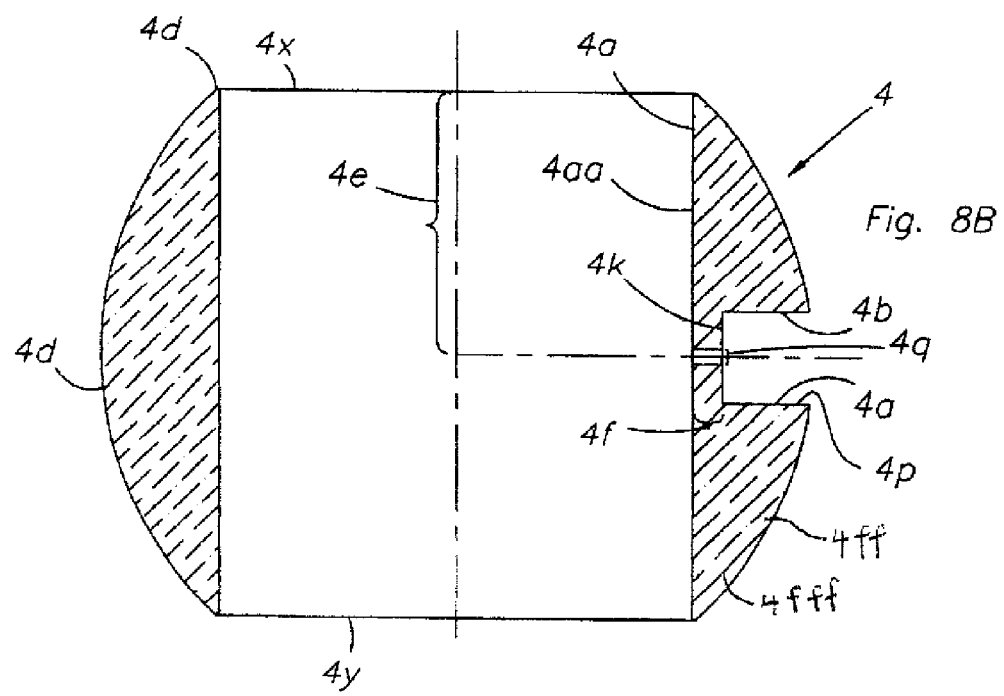
FIG. 8B illustrates a cross-sectional view of ball component along line A-A of FIG. 8A.

Referring to FIGS. 8A and 8B, ball component 4 comprises ball vent 4*j*, and ball vent aperture 4*j* is preferably (i) one-fourth inch in length and (ii) one-eighth inch in diameter. Ball vent aperture 4*j* is located proximal to, and is continuous with, ball component recess 4*b* and ball cylindrical bore 4*a*. Vent 4*j* prevents entrapment of contaminates within valve body 1 while ball component ceramic material 4*f* prevents scoring of ball component exterior surface 4*d*. As best seen in FIGS. 4C and 8A, stem proximal curved end 3*n* infra tightly lodges within ball component recess 4*b*. As best seen in FIGS. 8A and 8B, there is preferably 0.25 inch of ceramic material 4*f* between ball recess 4*b* and ball cylindrical bore surface 4*aa*.

E. Top Seat 5

Referring to FIGS. 1BB, 2, 3, 4C, 17A and 17B, top seat 5 is preferably (i) made of PTFE and (ii) positioned within body tube interior 1*aa* at upper body tube wall 67. Top seat 5 is positioned between, and is in continuous contact with, ball component 4 and body tube interior surface 1*f*. Top seat 5 is preferably (i) annular in structure (ii) 5.140 inches in maximum interior diameter (iii) 5.628 inches in maximum outer diameter and (iv) 0.450 inch in maximum thickness. Top seat 5 has an upper top surface 5*a* and a lower top surface 5*b*. Top seat 5 also has an exterior upper seat annular surface 5*c* and an interior upper seat annular surface 5*d*.

Figures 17A, 17B:
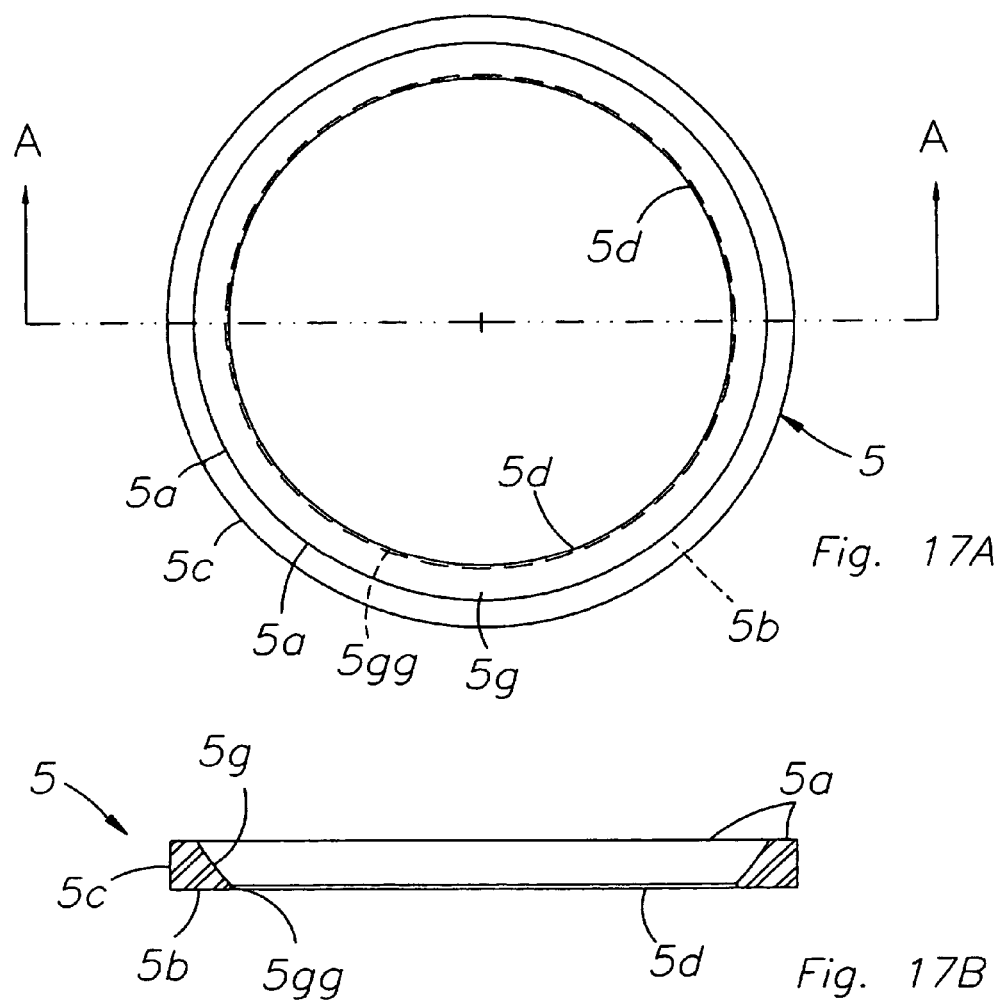
FIG. 17A is a top plan view of the top seat for the ball valve assembly of FIG. 2.
FIG. 17B is a sectional view along line A-A of FIG. 17A.
Figure 18:
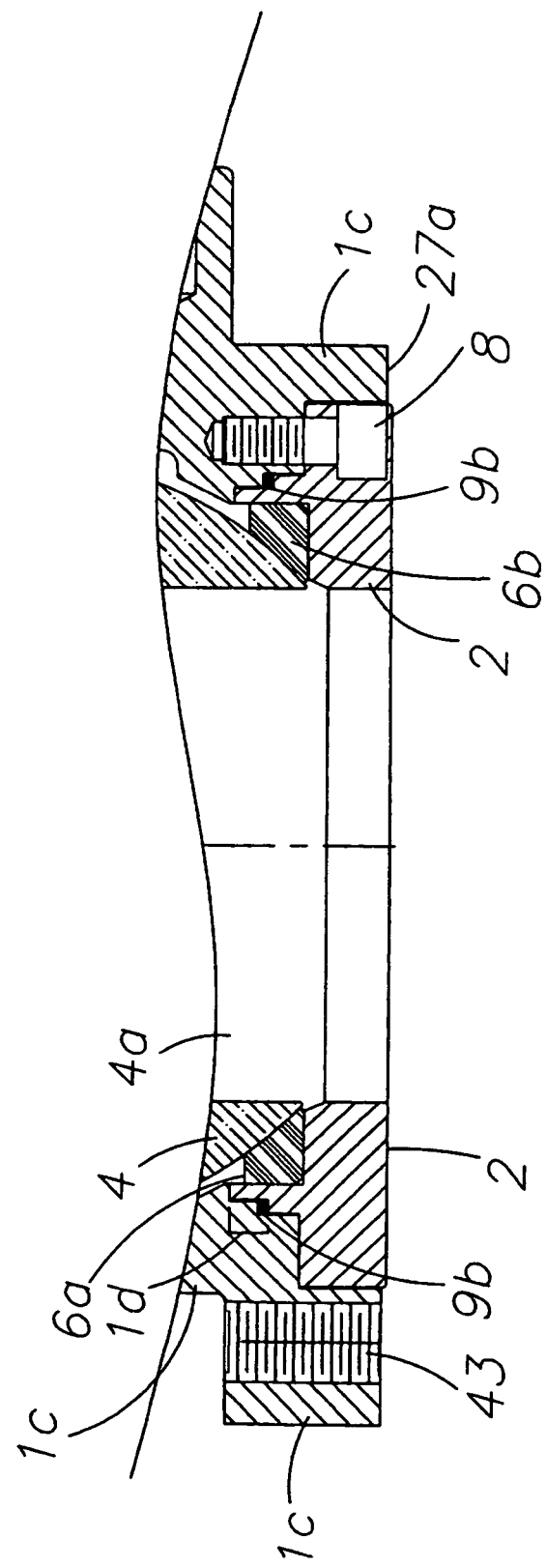
FIG. 18 is a lower partial sectional enlarged view of the ball valve assembly of FIG. 2.

As best seen in FIGS. 17A and 17B, top seat 5 comprises an upper seat bevel 5*g*. Upper seat bevel 5*g* flares (i) upwardly and outwardly from bottommost surface 5*b* to uppermost surface 5*a* (ii) at an angle of preferably 54 degrees from a perpendicular cross section of top seat 5 of FIG. 5A. Top seat 5 also comprises a single small continuous chamfer 5*gg* (i) at the bottom of upper seat bevel 5*g* along top lower seat surface 5*b* (ii) with a radius of preferably 0.03. Top seat 5 mechanically provides a seal to prevent leaks of liquid commodity 200 between and among ball component 4, valve body 1 and ceramic wiper 7 infra. Top seat 5 preferably comprises (i) a continuously smooth exterior surface 5*c* without grooves, other indentations or other structural features (ii) so seat 5 more effectively maintains continuous flush contact with body tube interior surface 1*f*.

F. Ceramic Wiper 7

Referring to FIGS. 1BB, 3, 4, 7A, 7B and 7C, ceramic wiper 7 is an annular component consisting entirely of a ceramic material five to seven times harder than stainless steel. Ceramic wiper 7 is positioned (i) within upper tube body interior 1*aa* and (ii) between top seat 5 and O-ring 9*a* infra. The preferred materials for ceramic wiper 7 are aluminum oxide, zirconium oxide and zinc oxide. Most preferably ceramic wiper is made of zirconium oxide with the identical macro material characteristics as the most preferred zirconium oxide of ball component 4 supra. Ceramic wiper 7 has an upper wiper surface 7*b* and a lower wiper surface 7*a*, an exterior wiper surface 7*c* and an interior wiper surface 7*d*. Ceramic wiper 7 is preferably approximately (i) 4.056 inches in minimum interior diameter (ii) 4.391 inches in maximum interior diameter (iii) 5.628 inches in maximum exterior diameter and (iv) 0.250 inch in thickness.

Figure 7A:
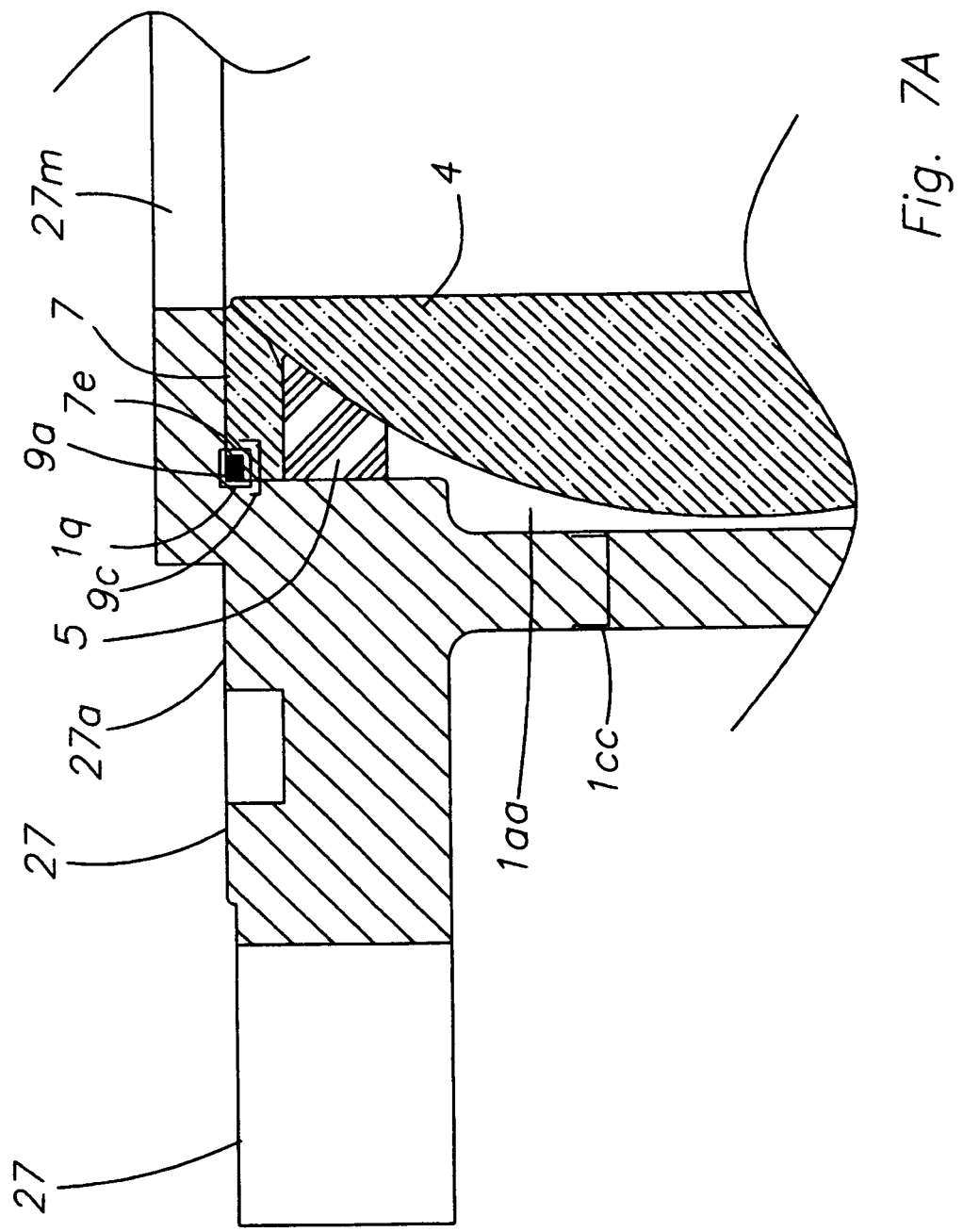
FIG. 7A illustrates a close up sectional view of the ceramic wiper and adjacent components of the ball valve assembly of FIG. 2.
Figure 7B:
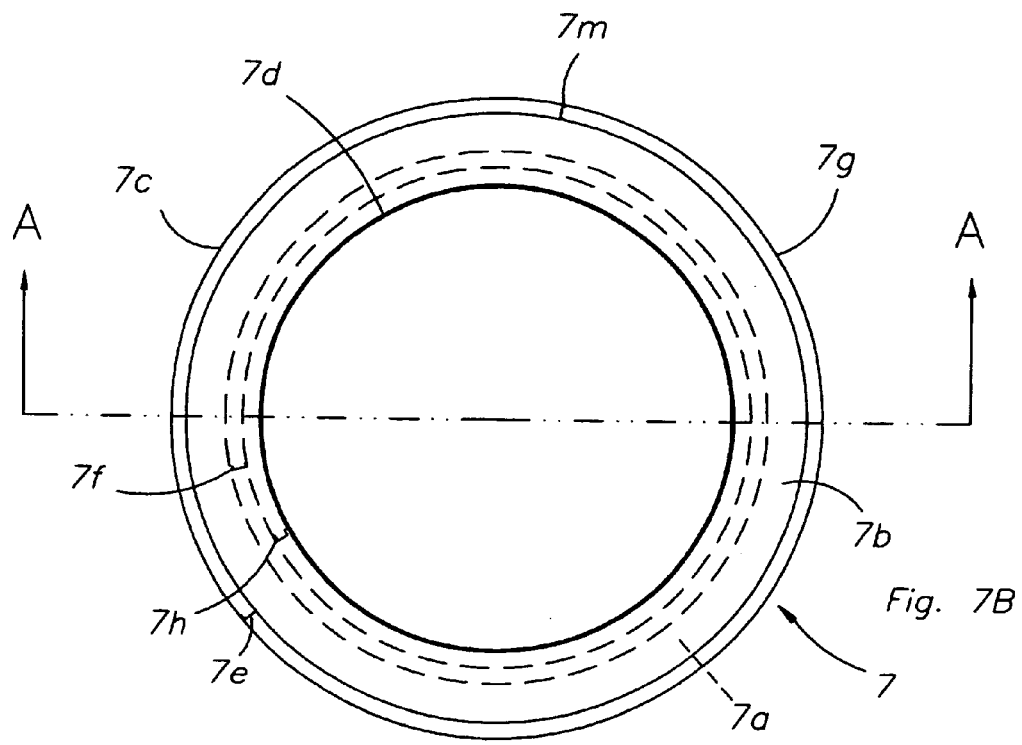
FIG. 7B illustrates an isolated upper plan view of the ceramic wiper of the ball valve assembly of FIGS. 1A, 1AA.
Figure 7C:
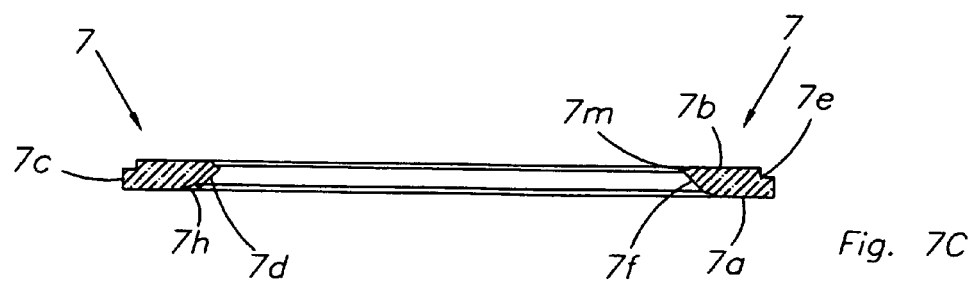
FIG. 7C is a cross-sectional view of the ceramic wiper along line A-A of FIG. 7B.
Figure 7D:
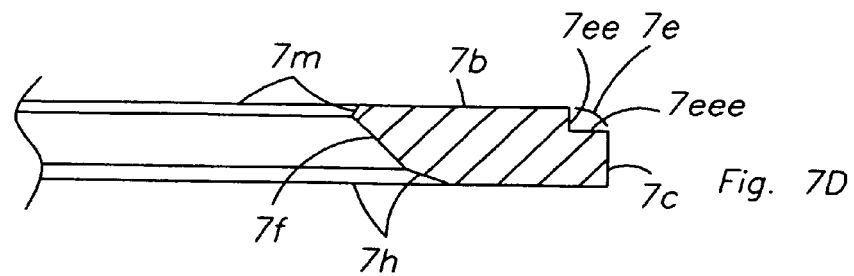
FIG. 7D is an enlarged close up view of FIG. 7C.

As best seen in FIGS. 7B, 7C and 7D, ceramic wiper 7 preferably comprises a single wiper circular chamfer 7*f* that (i) opens upwardly and outwardly to upper wiper surface 7*b* from wiper interior surface 7*d* and lower ceramic wiper surface 7*a* (ii) at an angle of preferably 45 degrees from perpendicular cross section of the ceramic wiper 7 of FIG.

7B (iii) with radius 3.00 and (iv) 0.036 inch in height. Ceramic wiper 7 also contains (i) a single continuous lower circular wiper bevel 7h at lower wiper surface 7a and (ii) a single continuous circular upper wiper bevel 7m at upper wiper surface 7b. Continuous circular wiper bevels 7h, 7m are each continuous with single circular continuous wiper chamfer 7f. Lower continuous circular wiper bevel 7h is preferably (i) 0.143 inch in length (ii) 0.047 inch in depth and (iii) forms an angle of 72 degrees with perpendicular cross section of the ceramic wiper 7 of FIG. 7B. Upper continuous circular wiper bevel 7m is preferably (i) 0.02 inch in length (ii) 0.036 inch in depth and (iii) forms an angle of 29 degrees with perpendicular cross-section of the ceramic wiper 7 of FIG. 7B.

Referring to FIGS. 7A, 7B, 7C and 7D, ceramic wiper 7 also comprises a single continuous smooth circular wiper groove 7e that is preferably (i) 0.077 inch in depth (ii) 0.145 inch in width and (iii) 16.93 inches in interior circumference along exterior wiper surface 7c. Smooth continuous wiper circular groove 7e is located at the intersection of ceramic wiper upper surface 7b and exterior ceramic wiper surface 7c. When ball valve assembly 100 is properly assembled, smooth continuous wiper circular groove 7e is continuous and contiguous with continuous upper flange circular groove 27k, to form continuous smooth upper O-ring circular notch 1q. Continuous smooth upper O-ring circular notch 1q contains upper O-ring 9a. whenever ball valve assembly 100 is properly assembled.

Whenever ball valve assembly 100 is properly assembled, ceramic wiper chamfer 7f mechanically prevents contaminants within liquid commodity 200 and tank interior from (i) by-passing ball component 4 and (ii) thereby embedding within top seat 5 and/or bottom seat 6. Wiper bevels 7h, 7b are configured so ceramic wiper 7 is less susceptible to chipping along upper wiper surface 7b and lower wiper surface 7a. Wiper bevels 7h; 7m and wiper chamfer 7f are also configured to push particles from seats 5, 6 whenever ball component rotates. Ceramic wiper 7 (i) must withstand the impact of abrasive contaminants over a protracted time period and (ii) therefore wiper 7 must be harder than these contaminant particles. Ceramic wiper 7 must also be positioned upstream within upper body tube interior 1aa to protect top seat 5.

Interior ceramic wiper surface 7d forms a continuous mating surface with ball component exterior surface 4d. This spherical interior mating surface comprising wiper bevel 7f, wiper chamfer 7h and wiper chamfer 7m (i) completely conforms to ball component radius 4e, and (ii) thereby creates a continuous mechanical joint that prevents particulate material from entering body tube interior 1aa containing seats 5, 6. Ceramic wiper 7 is held in place by ball component 4, so ceramic wiper 7 (i) is in mobile scraping contact with exterior ball component surface 4d and (ii) thereby traps abrasive and corrosive contaminants.

G. Body O-Rings 9a, 9b

Referring to FIGS. 2, 4C, 6, 7A and 18, ball valve assembly 100 comprises single sole and only upstream body O-ring 9a and single sole and only downstream body O-ring 9b. Each body O-ring 9a, 9b is preferably identical to the other with a smooth surface and uniform cross-sectional diameter. Each body O-ring 9a, 9b preferably has (i) an inner diameter of 5.487 inches (ii) a cross-sectional diameter of 0.103 inch and (iii) an exterior diameter of 5.693 inches. When ball valve assembly is properly assembled, upstream body O-ring 9a is preferably located within (i) lower continuous circular wiper groove 7e and (ii) continuous body tube circular interior groove 67 (iii) to form continuous circular wiper notch 1q. Please see FIGS. 1BB and 4C. Upstream body O-ring 9a provides a mechanical barrier to leakage of liquid commodity 200 between and among ceramic wiper 7, valve body 1 and top seat 5.

Referring to FIGS. 1BB, 2, 4C, 6 and 18, downstream body O-ring 9b is located within continuous lower body tube circular groove 1o along body tube interior surface 1f. Continuous lower body tube circular groove 1o is preferably approximately (i) 0.145 inch in depth (ii) 0.145 inches in width and (iii) 17.25 inches in interior circumference along body tube interior surface 1f. Downstream body O-ring 9b creates a mechanical barrier that prevents leakage of liquid commodity 200 between seat retainer 2 and valve body 1.

H. Stem Block 35

Referring to FIGS. 1BB, 3, 13A, 13B and 13C, stem block 35 comprises an integral solid component that is (i) positioned adjacent to body tube 1c and (ii) preferably made of steel. Stem block 35 can (i) comprise welds 41 to body tube 1c or (ii) be cast as an integral portion of valve body 1. Stem block 35 (i) is preferably partially rectangular in shape in perpendicular cross-section to stem block longitudinal axis 35c. Stem block 35 has a proximal stem block end 35a and a distal stem block end 35b. Stem block 35 is preferably (i) 2.195 inches in maximum longitudinal length 112 (ii) 2.92 inches in maximum height h5 and (iii) 2.16 inches in maximum depth d3. At stem block distal end 35b, stem block 35 comprises stop pin aperture 11a into which stop pin 11 inserts whenever ball valve assembly 100 is properly assembled.

Referring to FIGS. 13A, 13B and 13C, stem block 35 comprises a single stem block longitudinal cavity 35d that mechanically confines stem 3, stem packing 15 and packing spacer 16 whenever ball valve assembly 100 is properly assembled. Stem block longitudinal cavity 35d comprises a continuous rigid smooth interior longitudinal stem block cavity wall 35i that is (i) preferably completely smooth and (ii) shaped to conform to, and be slightly wider in cross-section diameter than, stem 3, stem packing 15 and packing spacer 16 within stem block longitudinal cavity 35d. Stem block interior longitudinal cavity 35d comprises a proximal stem block cavity 35f, a median stem block cavity 35g and a distal stem block cavity 35h. Medial stem block cavity 35g is preferably (i) 0.772 inch in longitudinal length and (ii) 1.274 inches in diameter. Proximal stem block cavity 35f is preferably (i) 0.277 inch in longitudinal length and (ii) 1.774 inches in diameter, while distal stem block cavity 35h is preferably (i) 1.21 inches in longitudinal length and (ii) 1.774 inches in diameter.

I. Stem 3

Referring to FIGS. 1A, 1BB, 2, 3, 4A, 4B, 4C, 4D, 6, 9A, 9B, 9C, 19A, 19B and 19C, stem 3 is (i) preferably an integral partially cylindrical rigid solid that is machined from steel and (ii) positioned within stem block 35 so longitudinal stem axis 3c is superimposed upon stem block longitudinal cavity axis 35c (iii) whenever ball valve assembly 100 is properly assembled. Stem 3 is preferably (i) 4.393 inches in maximum longitudinal length 3j and (ii) 1.75 inches in maximum diameter. Stem 3 has a single proximal stem end 3a and a single distal stem end 3b. Stem block longitudinal axis 35c and superimposed longitudinal stem axis 3c are (i) straight, linear (ii) perpendicular to ball component recess posterior wall 4k and (iii) positioned at center point 4k of ball recess posterior wall 4k and (iv) in parallel alignment with ball component lateral recess wall 4p (v) whenever ball valve assembly 100 is properly assembled. Stem 3 also comprises stem screw aperture 3x, and screw 34 reversibly inserts into stem screw aperture 3x in a properly assembled ball valve assembly 100.

As best seen in FIGS. 9A, 9C, 19A and 19C, stem 3 comprises (i) a single cylindrical medial threaded longitudinal stem segment 3m with threading 3mm along exterior stem surface 3e (ii) a single proximal smooth cylindrical solid longitudinal segment 3g with a smooth exterior stem surface 3gg and (iii) a smooth single distal longitudinal segment 3q that is square in cross-section perpendicular to stem longitudinal axis 3c. Each longitudinal stem segment 3g, 3q is preferably contiguous, continuous and integral with longitudinal stem segment 3m. As best seen in FIGS. 9A and 9C, half-disc shaped protuberance 3n (i) forms proximal stem end 3a and (ii) is preferably shaped as a quarter-sphere in a configuration well known in this particular industry. Half-disc shaped protuberance 3n preferably comprises a radius of 1.375 along protuberance exterior curved surface 3nn.

Half-disc shaped protuberance curved surface 3nn (i) inserts within ball component recess 4b and (ii) is mechanically retained therein by a continuous tight fit within ball component recess interior rigid surface 4b. Please see FIGS. 8A and 8B. Half-disc shaped protuberance 3n is proximal to smooth solid proximal cylindrical longitudinal segment 3g. Proximal cylindrical longitudinal segment 3g is (i) integrally continuous with medial threaded longitudinal stem segment 3m (ii) located proximal to medial threaded longitudinal stem segment 3m (iii) 3.275 inches in longitudinal length and (iv) 1.250 inches diameter. Medial threaded longitudinal stem segment 3m is preferably (i) 1.28 inches in longitudinal length and (ii) 1.25 inches in a cross-sectional diameter perpendicular to stem longitudinal axis 3c.

Integrally connected to medial threaded longitudinal stem segment 3m is continuous distal longitudinal stem segment 3q with smooth continuous distal exterior stem segment surface 3qq. Referring to FIGS. 9A, 9B, 9C, 19A, 19B and 19C, distal longitudinal stem segment 3q is preferably (i) one and one-quarter inches in longitudinal length 110 and (ii) 0.875 inch on each side in square cross-section diameter perpendicular to longitudinal stem axis C1. Distal stem longitudinal segment 3q comprises distal stem longitudinal segment bore 3z, and bore 3z is preferably centrally positioned along stem longitudinal segment 3c.

Distal stem longitudinal segment bore 3z also congruently aligns with, and is superimposed upon, stem longitudinal stem axis 3c. Distal stem longitudinal segment bore 3z preferably comprises (i) a smooth interior bore wall surface 3zz and (i) four rounded stem bore edges 31, 3m, 3n, 3o in cross section perpendicular to stem longitudinal axis 3c. Each rounded stem bore edge 31, 3p, 3o and 3r has a corresponding radius of preferably 0.09. Distal longitudinal stem segment 3q is the portion of stem 3 (i) into which drive coupling proximal segment end 17a inserts infra.

As best illustrated in FIGS. 9A, 9B, 9C, 19A, 19B and 19C, distal longitudinal stem segment 3q contains a single set screw stem aperture 3x. Set screw stem aperture 3x is preferably (i) perpendicular to stem longitudinal axis 3c and (ii) 0.478 inches from stem distal end 3b. Set screw stem aperture 3x has a (i) first set screw stem aperture opening 3y and (ii) second set screw aperture opening 3yy. Set screw aperture openings 3y, 3yy directly oppose each other at 180 degrees along exterior stem surface 3qq of distal stem segment 3q. Whenever set screw stem aperture 3x concentrically aligns with drive coupling screw aperture 17e infra, a single set screw 34 can reversibly insert and thereby mechanically attach stem 3 to drive coupling 17.

As best illustrated in FIGS. 9C and 19C, longitudinal stem groove 3d (i) is parallel to stem longitudinal axis 3c and (ii) is preferably machined into exterior threaded surface 3e of medial stem segment 3m. Longitudinal stem groove 3d reversibly and mechanically engages indicator plate tab 50 whenever ball valve assembly is properly assembled. Please see FIG. 21. Longitudinal stem groove 3d has a rigid continuous smooth interior surface 3s preferably consisting of (i) two perpendicular stem groove rigid side walls 3t, 3tt and (ii) a single rigid flat bottom surface 3dd. Longitudinal system groove 3d is preferably (i) 1.08 inches in longitudinal length (iii) 0.189 inch in width and (ii) 0.188 inch in depth.

Stem 3 translates rotation of prior art opening tool 20, generally a handle 20b to ball component 4 through the above described mechanical attachment at ball component recess 4b. As best seen in FIG. 8A, stem 3 mechanically connects to ball component 4 at proximal stem end 3a by mating half-disc curved exterior surface 3nn with ball recess surface 4bb in a contiguous manner well known in the industry.

J. Thrust Washer 10 and Stop Pin 11

Figure 2:
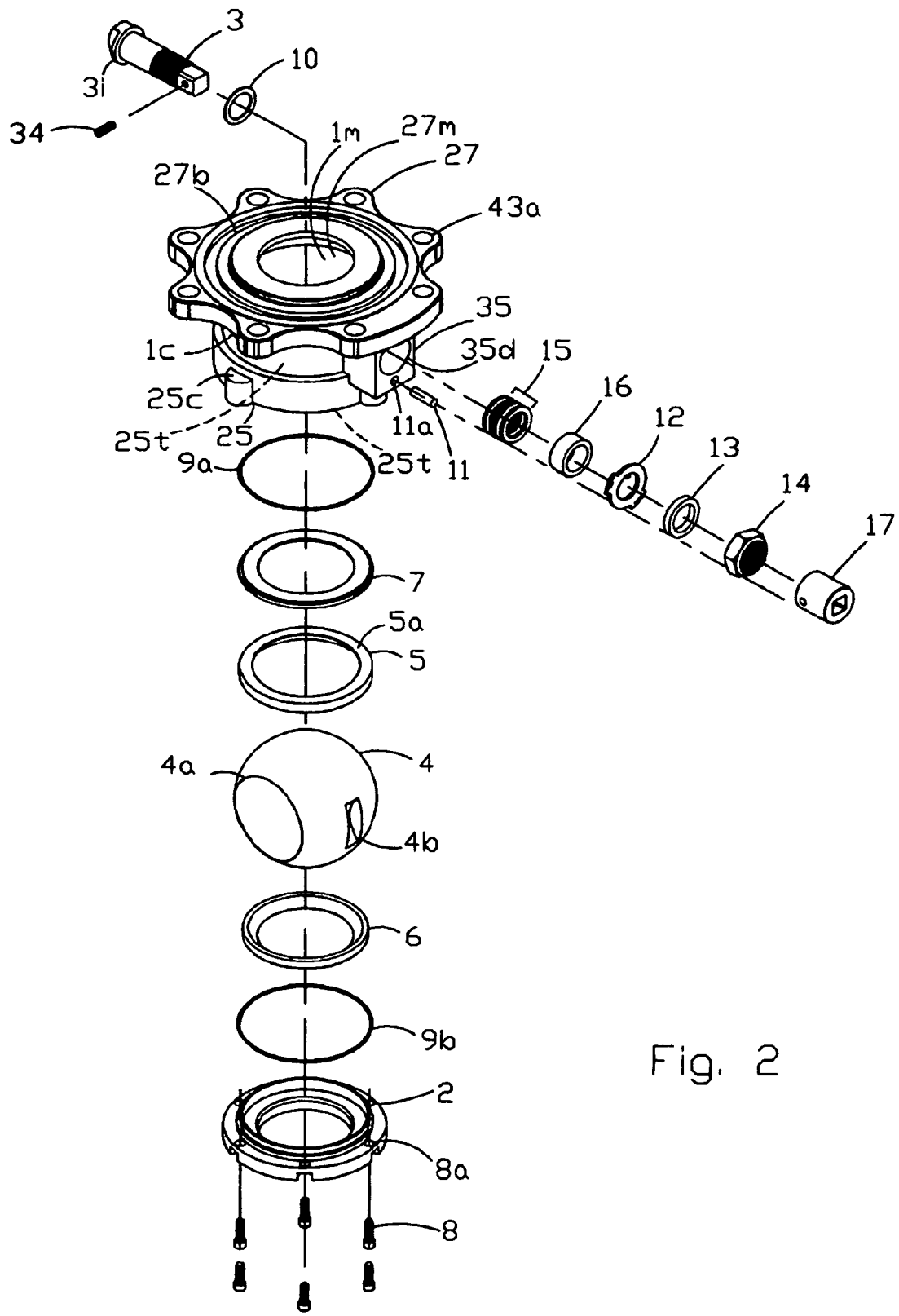
FIG. 2 illustrates an exploded view of the preferred embodiment of the ball valve assembly of FIGS. 1A, 1AA.
Figure 21:
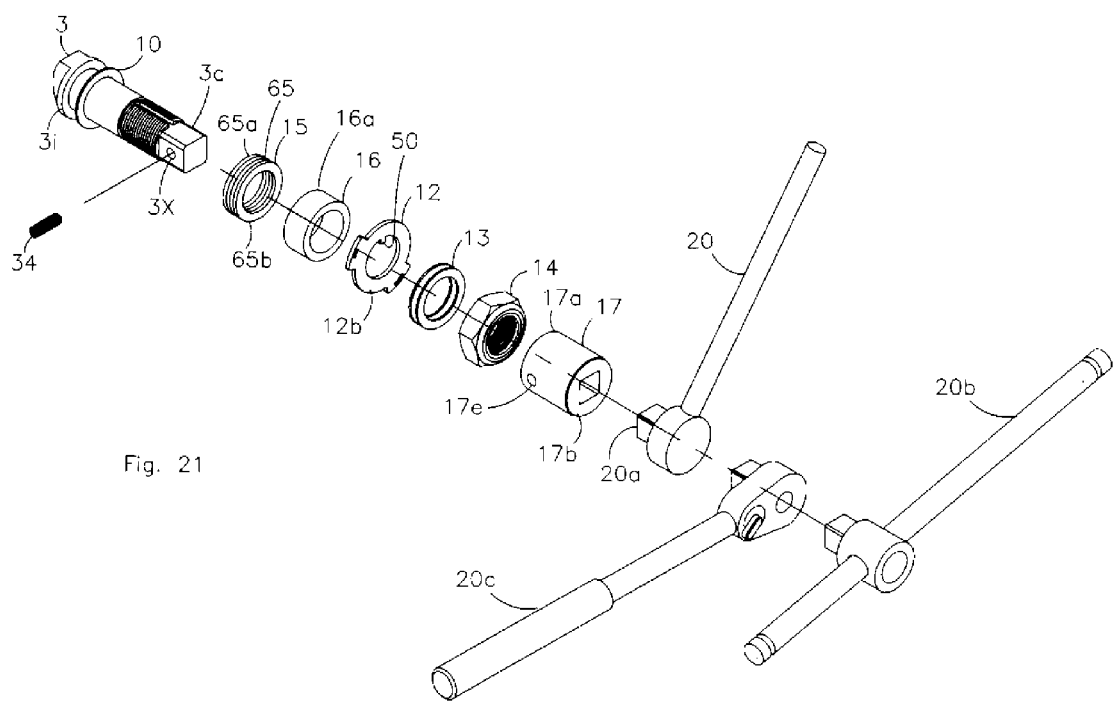
FIG. 21 illustrates an enlarged exploded view of the stem, stem packing assembly, drive coupling in the preferred embodiment along with a representative square drive tool.
Figure 22:
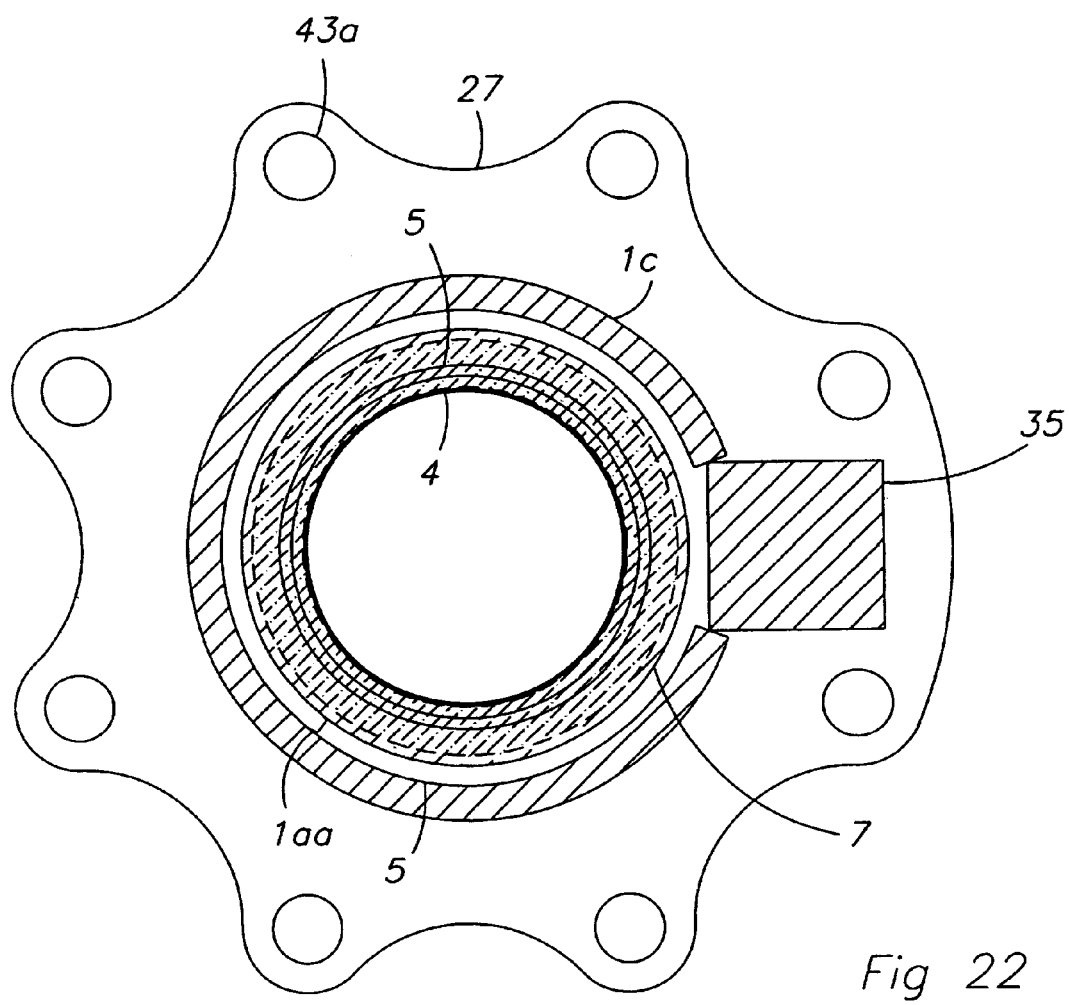
FIG. 22 illustrates an upper plan view of the ball valve assembly with ceramic wiper.

Referring to FIGS. 2, 4C and 21, thrust washer 10 (i) is preferably made of PTFE and (ii) provides a substantially reduced friction interface between valve body 1 and machined stem collar 3i. Thrust washer 10 is preferably approximately (i) 1.774 inches in exterior diameter (ii) 1.274 inch in interior diameter and (iii) one-sixteenth inch in thickness. Stop pin 11 is preferably (i) made of steel and (ii) provides a 90 degree rotation of ball component 4 to a fully open or closed position in a well known manner. Stop pin 11 is preferably approximately (i) three-eighths inch in diameter and (ii) one and one-quarter inches in length.

K. Stop Indicator Plate 12

Referring to FIGS. 2, 4C, 6 and 21, stop indicator plate 12 is preferably (i) made of steel and (ii) positioned in a direction perpendicular to and along threaded longitudinal axis 3a of threaded stem segment 3m. Stop indicator plate 12 is preferably (i) maintained axially along threaded segment 3mm by square indicator tab 50 respectively and (ii) preferably square tab 50 is an integral structural feature of stop indicator plate 12 (iii) where square tab 50 inserts within stem longitudinal slot 3d. Stop indicator plate 12 (i) restricts stem rotation to a maximum of ninety degrees and (ii) provides a visual indication of an open or closed valve position to operating personnel in a well known manner.

L. Wave Spring 13

Referring to FIGS. 2, 3, 4C, 20A, 20B and 21, wave spring 13 is (i) preferably made of stainless steel with the following mechanical properties (i) Tensile strength UTS, ksi(MPa) 1517 and (ii) Hardness(Rockwell) C43. This specific stainless steel is also particularly corrosion resistant, but carbon steel is also satisfactory. Wave spring 13 is (ii) located between packing spacer 16 and stop indicator plate 12 and (iii) oriented in a direction perpendicular to stem longitudinal axis 3c whenever ball valve assembly 100 is properly assembled. Wave spring 13 preferably (i) is 1.34 inches in inner diameter (ii) 0.018 inch in strip thickness (iii) comprises four turns and (iv) comprises shim ends. Wave spring 13 provides mechanical compression to stop indicator plate 12, as well to packing spacer 16 and stem packing 15 to in addition to compression of stem lock nut 14 infra.

As time and wear from use in a mobile container increase in previously existing devices, stem packing 15 diminishes in volume and density. As a result an excessive physical clearance develops between stem block 35 and stem 3, and this clearance becomes a channel for liquid commodity leakage from body tube 1c. In contrast, with the current invention ball valve assembly 100 is initially assembled by the manufacturer with a maximally compressed wave spring 13. Please see FIGS. 20A and 20B. This compression results in an initial maximum elastic potential energy xx1 within wave spring 13 while wave spring 13 presses against packing spacer 16 and stop indicator plate 12.

Figure 20B:
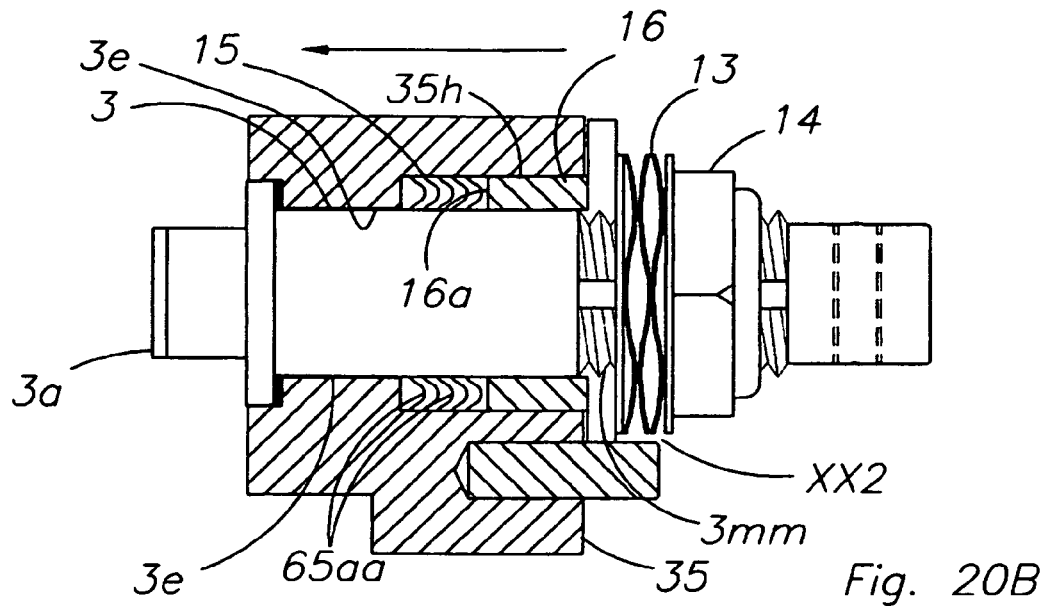
FIG. 20B illustrates the components in FIG. 20A when the wave spring relaxes and further compresses the stem packing in the direction of the arrow.
Figure 20A:
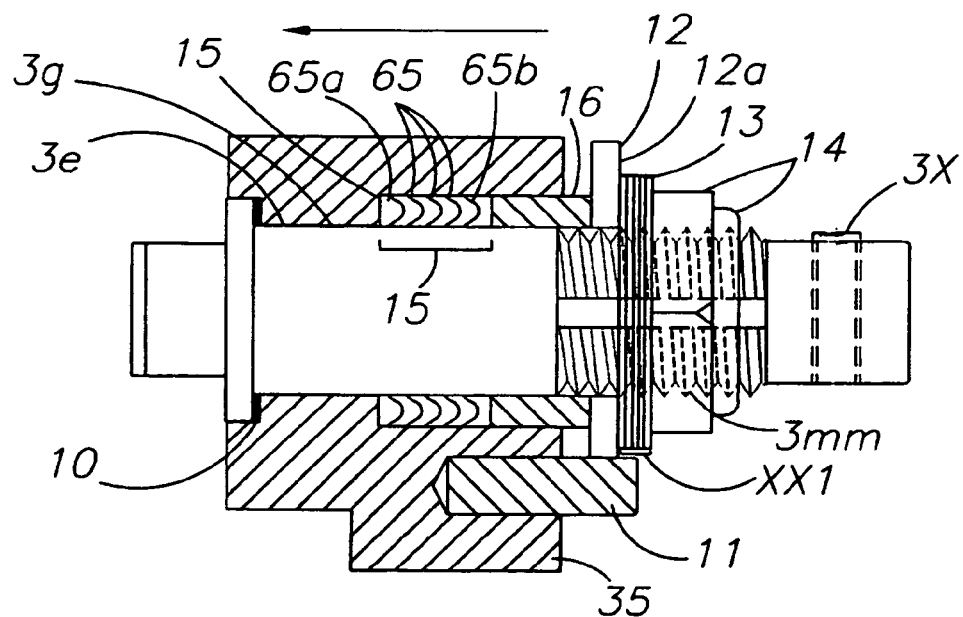
FIG. 20A is a lateral cross-sectional view of the stem block with stem packing assembly and arrows in the direction of compression by a wave spring.

As a result, over the effective life time of valve assembly 100 (i) wave spring 13 gradually releases elastic potential energy xx2 as pressure against receding stem packing 15 (ii) in the direction of the arrow in FIGS. 20A and 20B. This released energy results in wave spring 13 expansions and spring 13 physically presses upon stem packing 15. Upon pressure, stem packing 15 reconfigures to a smaller and denser volume. Wave spring 13 thereby prevents (i) an excessive physical clearance from developing between stem 3 and stem packing 15 (ii) while stem packing 15 is simultaneously compressed into a denser, leak proof material.

M. Packing Spacer 16

As best illustrated in FIGS. 4, 20A, 20B and 21, packing spacer 16 is preferably a single integral solid stainless steel component, and this stainless steel most preferably exhibits the following mechanical properties: (i) 0/2% YSKsi (MPa) 42 (290) and (ii) hardness (Rockwell) B82. However, packing spacer 16 may also be made of carbon steel. Packing spacer 16 is an annular tube-like component positioned between (i) stem packing 15 and (ii) stop indicator plate 12 and (iii) along stem longitudinal axis 3a (iv) in a perpendicular orientation to longitudinal stem axis 3a. Packing spacer 16 most preferably consists of stainless steel and is preferably (i) 1.265 inches in interior diameter (ii) 1.76 inches in exterior diameter and (iii) 0.75 inch in longitudinal length.

N. Stem Packing 15

Referring to FIGS. 2,4C, 20A, 20B and 21, stem packing 15 is (i) preferably made of PTFE (ii) mechanically confined within longitudinal stem bore 3h and (iii) continuously compressed upon stem exterior surface 3e. Stem packing 15 preferably consists of several chevron rings 65a, 65, 65b that align (i) perpendicular to stem longitudinal axis 3c and (ii) concentrically with each other. Each chevron ring 65a, 65, 65b is preferably approximately (i) 1.25 inches in inner diameter (ii) 1.75 inches in outer diameter and (iii) $^{13}\!/_{16}$ inch in thickness.

Stem packing 15 most preferably comprises (i) a single convex proximal chevron ring 65a and (ii) a single distal concave chevron ring 65b (iii) with a total of three to four interior chevron rings 65. Each proximal convex chevron ring 65 and distal chevron ring 65a, 65b respectively confines intermediate chevron rings 65. Each convex chevron ring 65a or 65 fits within the single concave face 65c of adjacent chevron ring 65b or 65 as the case may be. Each individual chevron ring 65a, 65, 65b provides a tight mechanical seal with (i) stem longitudinal cavity wall 3z and (ii) stem exterior surface 3e to prevent leakage of liquid commodity 200 between valve body 1 and stem 3.

Referring to FIGS. 4C, 6, 20A and 20B, stem packing 15 is confined within longitudinal cylindrical stem bore interior surface 3z, stem exterior surface 3e, and packing spacer proximal surface 16a. Stem packing 15 is continuously mechanically compressed upon stem exterior surface 3e by longitudinal cylindrical bore interior surface 3z, indicator plate 12, wave spring 13 and stem lock nut 14. During rotation stem packing 15 experiences wear from continuous frictional and mechanical contact with stem rotating exterior surface 3e. In addition, PTFE of valve assembly interior components, such as stem packing 15, will cold flow between stem 3 and valve body 1, as well as between and among packing spacer 16, valve body 1 and stem 3. Furthermore, the clearance between rotating stem 3 and stem packing 15 becomes increasingly physically inconsistent and uneven as stem packing 15 deforms. Consequently stem packing assembly components are no longer aligned perpendicular to the longitudinal stem axis 3 and thereby result in additional wear to rotating stem 3.

In the current industry, stem packing 15 and stem spacer 16 are machined to as close a tolerance to stem 3 as is technically possible when a ball valve assembly is initially manufactured. Nevertheless, stem packing 15 and stem spacer 16 rotation clearances must exist for stem 3 to operate. Because of this clearance requirement and inevitable wear, packing spacer 16 must be further compressed to stem 3 to provide an adequate seal. Without wave spring 13, there is loss of mechanical compression and leakage of liquid commodity 200 within stem packing 15. This is because an initially compressed wave spring 13 exerts force upon packing spacer 16 and stem assembly 15 (i) over a protracted operating time period (ii) in the direction indicated by arrows in FIGS. 20A and 20B. In contrast to the disc springs in previously existing valve assemblies, wave spring 13 does not require a diameter so wide that the diameter dimension prevents appropriate operation of stem 3.

Upon commencing of ball valve assembly 100 operation, stem packing 15 immediately undergoes the above described wear, as well as temperature 'swing' deterioration, of the mobile application of the ball valve assembly 100. Because of these temperature variations, friction and other wear, stem packing 15 diminishes in density, dimensions, and becomes increasingly damaged over prolonged time and use. To counteract this inevitable damage, elastic potential energy stored in compressed wave spring 13 is increasing exerted as pressure upon stem packing 1 in the direction of the respectively arrows in FIGS. 20A and 20B. Compressed wave spring 13 is increasing decompressed during this process and the released potential energy thereby maintains stem packing (i) at an appropriate density and (ii) adjacent to stem exterior surface 3e and stem bore interior wall surface 3z while (iii) maintaining the required clearance. As a result of this compression, stem packing 15 also becomes shorter in stem packing longitudinal length 15c. However, as wave spring gradually expands longitudinally over time, this discrepancy in stem packing longitudinal length is replaced by expanded wave spring longitudinal length.

Referring to FIGS. 2, 3, 4B and 21, threaded stem lock nut 14 is preferably (i) comprised of zinc plated steel and (ii) encircles and engages threaded medial stem section 1m. Stem lock nut 14 provides initial and interim compression for stem packing 15 and (iii) retains stem 3 within ball valve assembly 100.

O. Drive Coupling 17

Referring to FIGS. 1A, 1AA, 1B, 1BB, 2, 3, 5A, 5B, 5C and 21, drive coupling 17 is preferably made of carbon steel. Drive coupling 17 has a single proximal drive coupling end 17a and a single distal drive coupling end 17b. Drive coupling 17 is preferably (i) 1.75 inches in total longitudinal length 14 and (ii) 1.75 inches in diameter d21 of perpendicular cross-section d22. Drive coupling 17 contains a single continuous drive coupling longitudinal channel 17f superimposed along linear drive coupling linear longitudinal axis 17i. Drive coupling longitudinal channel 17f is also centrally positioned within drive coupling 17 along drive coupling longitudinal axis 17i. Drive coupling longitudinal channel 17f has a continuous smooth interior drive coupling wall 17ff.

Referring to FIGS. 5A, 5B and 5C, drive coupling longitudinal channel 17f preferably comprises (i) a single larger proximal drive coupling channel segment 17g and (9ii) a smaller distal drive coupling channel segment 17h. Larger proximal drive coupling channel segment 17g is preferably (i) square in cross-sectional shape perpendicular to drive coupling longitudinal center line 17i (ii) with round corners 17m, 17n, 17o and 17p. Larger proximal drive coupling segment 17g is preferably (i) 0.890 to 0.895 inch in length 110 along each square side 17k (iii) 0.88 inch in longitudinal length 111 and (ii) preferably has a radius of curvature of each rounded corner 17m, 17n, 17o, 17p of 0.09. Larger proximal drive coupling channel segment 17g also comprises a single socket stem screw aperture 17e.

Figure 3:
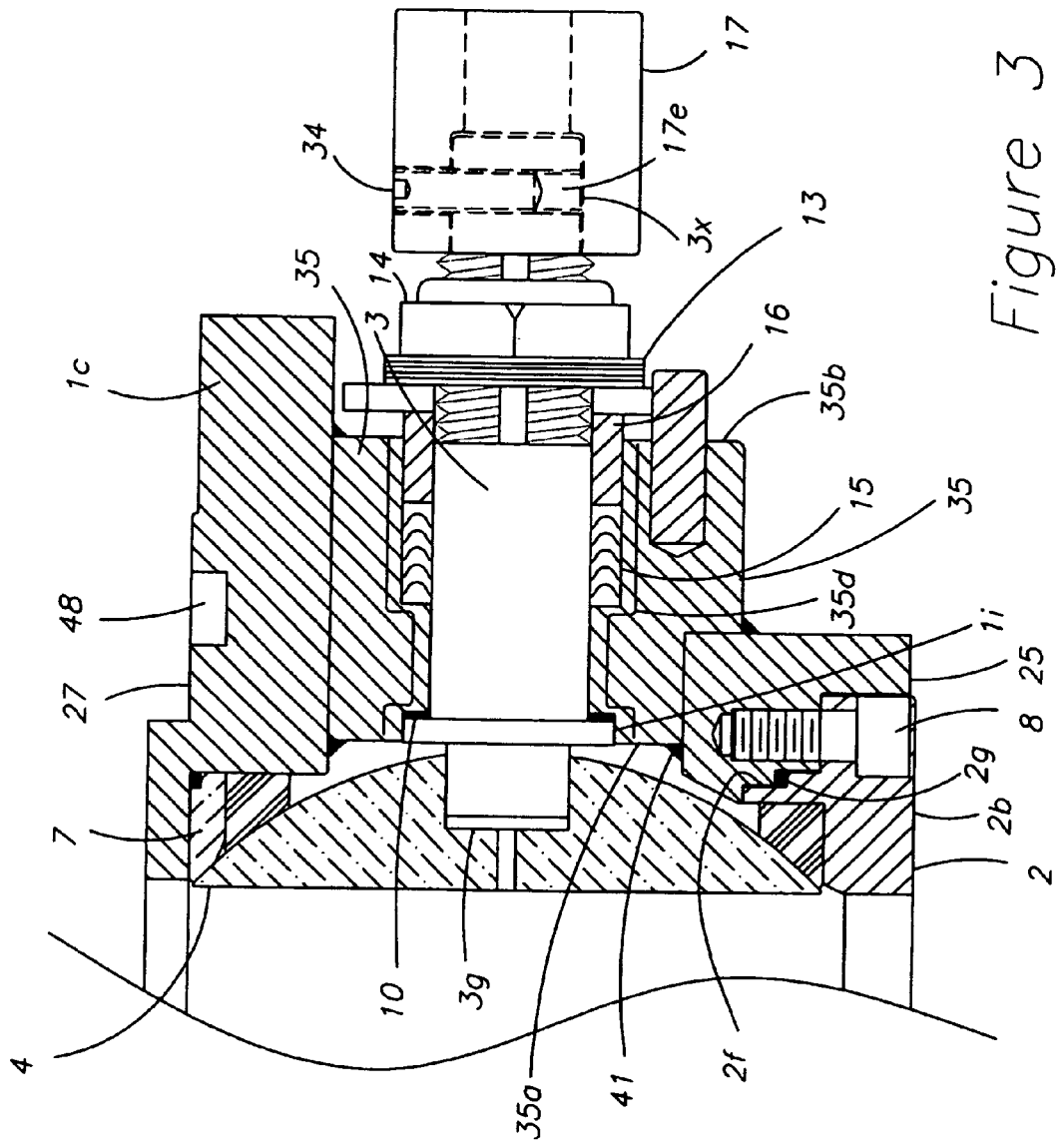
FIG. 3 illustrates a close partial lateral sectional view of the ball valve assembly whenever valve body contains welds.

As best seen in FIG. 3, a drive coupling socket stem screw 34 can penetrate congruently and concentrically aligned (i) drive coupling aperture 17e and (ii) distal stem segment aperture 3x (iii) in a direction perpendicular to drive coupling longitudinal axis 17i. Drive coupling socket set crew 34 is preferably (i) made of alloy steel such as stainless steel and (i) a self locking socket set screw. Drive coupling socket set screw 34 is preferably approximately (i) 5/16 inch in diameter (ii) one inch in longitudinal length. Whenever drive coupling socket set screw 34 is inserted, screw 34 is preferably initially coated with a heated liquid nylon material that is standard in the industry for this purpose. As best seen in FIGS. 1A and 21 (i) whenever larger longitudinal drive coupling channel segment 17g encompasses distal stem segment 3q, (ii) drive coupling set screw 34 inserts into distal stem end segment 1q through concentrically and congruently aligned distal stem aperture 3x and drive coupling aperture 17e (iii) thereby mechanically connecting stem distal end 3b to drive coupling proximal end 17a.

Referring to FIGS. 5B and 5C, continuous with and distal to larger longitudinal channel segment 17d is a single smaller drive coupling longitudinal channel segment 17h at distal drive coupling end 17b. Smaller drive coupling longitudinal channel segment 17h is preferably (i) square in perpendicular cross-section to drive coupling channel longitudinal axis 17i and (ii) 0.753 to 0.758 inch on each cross-sectional square side 17k. Smaller drive coupling longitudinal channel segment 17h also comprises four continuous rounded corners 17r, 17s, 17t, 17u (i) in perpendicular cross-section to drive coupling longitudinal axis 17i and (ii) each corner 17r, 17s, 17t, 17u preferably has a corresponding radius 0.06.

Referring to FIG. 21, drive coupling 17 can attach simultaneously to (i) distal square stem end 3b at proximal drive coupling end 17a and (ii) proximal square drive tool end 20a at distal drive coupling end 17b. Smaller distal drive coupling longitudinal channel segment 17h snugly mechanically and reversibly receives (i) proximal square drive tool end 20a of most of the group consisting of square drive tools 20 (ii) to retain drive coupling 17 to square drive tool 20. Simultaneously larger proximal drive coupling longitudinal channel segment 17g mechanically and reversibly inserts into stem distal longitudinal segment 3q.

Referring to FIGS. 1BB and 21, drive coupling proximal larger channel segment 17g slides over distal stem segment 3q where segment 17g is mechanically and reversibly secured by (i) socket stem screw 34. Proximal square drive tool end 20a snugly, mechanically and reversibly inserts into distal drive coupling longitudinal channel segment 17h to operatively rotate stem 3. Whenever a square drive tool such as square drive tool 20 or 20c is operatively attached to stem 3, stem 3 will rotate ball component 4 through a maximum of 90 degrees to an open or closed position by stem mechanical engagement with ball component recess 4b. Conventional square drive tool 20 or 20c can be, but not exclusively, a ratchet, torque wrench, flex head handle, sliding t-handle or bull handle.

Drive coupling 17 eliminates leakage and discharge events associated with permanently attached conventional handles 20, because it eliminates pre-attached square drive tools with handles 20 during operation. As a result, during a hazardous incident there is no pre-attached square drive tool (i) to unintentionally shear from and thereby open ball valve assembly 100 (ii) with a resulting torrent of liquid component 200 into the environment. Drive coupling is a component of the preferred embodiment of improved ball valve assembly 100. However, in other embodiments ball valve assembly 100 is also operational when (i) attached to a wrench and (ii) drive coupling 17 is absent.

II. Assembly of Bottom Outlet Ball Valve Assembly 100

Figure 6:
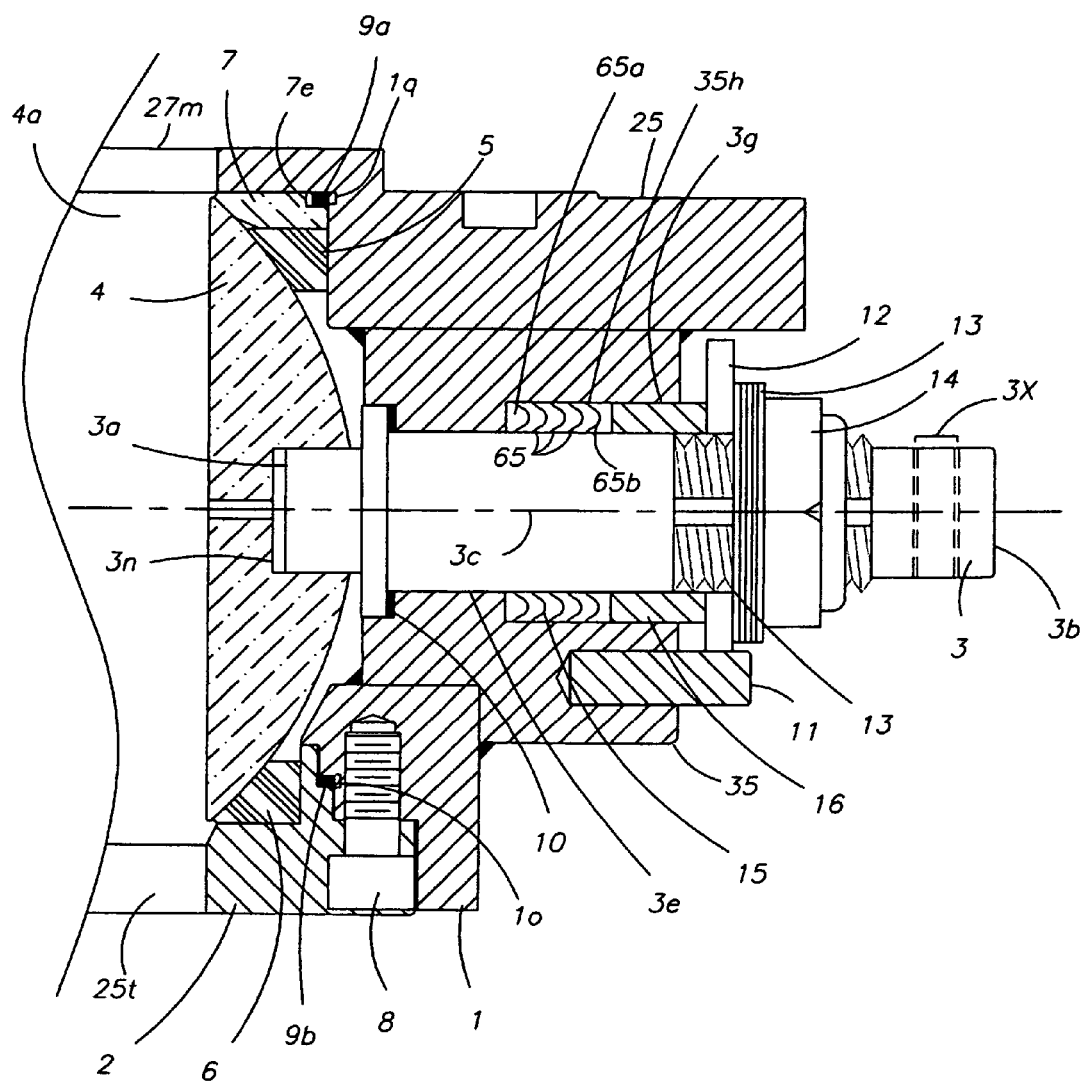
FIG. 6 illustrates an enlarged lateral sectional view of the ball valve assembly of FIGS. 1A, 1AA and 2 without the drive coupling.

As best illustrated in FIG. 1B, ball valve assembly 100 is assembled as follows:

1. Body tube 1c is placed upside down on a suitable fixture.
2. The operator next (i) places thrust washer 10 onto stem proximal to stem distal end 3b and (ii) thereafter pushes thrust washer 10 onto stem 3 until thrust washer 10 seats against stem collar 3i. FIGS. 2 and 21.
3. The operator next inserts stem 3 into tube body uppermost opening 1m into body tube interior 1aa, and then through body tube lateral opening 1i. FIGS. 1A and 2. The operator next installs stem packing 15 (i) longitudinally along stem 3 (ii) while stem 3 protrudes from body tube lateral opening 1i through stem block longitudinal cavity 35d as follows:

(i) Proximal convex chevron ring 65a with concave chevron surface 65aa facing proximally towards proximal stem end 3a;

(ii) Distal chevron ring 65b and intervening chevron rings 65 that fit within corresponding chevron concave surfaces 65aa. FIGS. 20A and 20B;

(iii) Thereafter the operator presses chevron rings 65a, 65, 65b into stem block longitudinal cavity 35h. FIG. 6, 20B.

5. The operator next inserts packing spacer 16 into stem block continuous longitudinal cavity 35d, so packing spacer 16 is positioned distal to distal chevron ring 65b, as seen in FIGS. 20A and 20B.

6. The operator next (i) inserts stop indicator plate 12 onto stem 3 (ii) with any opening and closing written instructions upon stop indicator plate surface 12b facing away from body tube 1c. FIG. 21.

7. The operator next positions wave spring 13 over and onto stem 3 immediately adjacent and distal to stop indicator plate 12. FIGS. 20A, 20B and 21.

8. The operator next (i) positions stem lock nut 14 over and onto stem 3 adjacent and distal to wave spring 13 (ii) where stem lock nut 14 engages stem exterior threads 33m.

By rotating stem lock nut 14 along stem threading 1mm, the operator then torques nut 14 to preferably 150 foot pounds. FIG. 21.

9. The operator next inserts proximal larger drive coupling bore segment 17g into distal stem segment 3q so drive coupling aperture 17e congruently aligns with distal stem segment aperture 3x. He or she then threads set screw 34 into both concentrically aligned apertures 3x, 17e to mechanically attach drive coupling 17 to stem distal longitudinal segment 3q. FIGS. 1A, 1BB, 21.

10. The operator thereafter places uppermost body O-ring 9a into uppermost corner 67 of body tube interior surface 1f. FIG. 1BB,4C.

11. The operator next inserts ceramic wiper 7 through upper body tube opening 1m and upper flange opening 27m into body tube interior 1aa so (i) uppermost body O-ring 9a is snugly wedged within upper O-ring notch 9c and (ii) where upper O-ring notch 9c is created by adjacent body tube groove 1q and ceramic wiper groove 7e (iii) and ceramic wiper groove 7e is formed by wiper short sides 7ee and 7eee. Wiper short sides 7ee and 7eee are rigid, smooth and perpendicular to each other. FIGS. 7A, 7C and 7D.

12. The operator next (i) places top seat 5 into body tube interior 1aa (ii) so seat 5 is above and contacting ceramic wiper 7 (iii) with top seat upper surface 5a facing upwards. FIGS. 2, 4C.

13. The operator thereafter rotates stem 3 to a closed position so proximal stem curved end 3n continuously will contact ball component recess walls 4k, 4b and 4f. FIGS. 8A and 8B.

14. The operator next places ball component 4 into body tube 1c through upper body tube opening 1m, so proximal stem end 3a (i) aligns perpendicular to ball component recess posterior wall 4k (ii) along longitudinal stem axis 3i (iii) at ball component posterior recess wall point 4q. FIGS. 8A and 8B.

15. Seat retainer 2 is next placed upon a rigid horizontal surface with seat retainer lowermost flat surface 2b facing upward.

16. The operator places bottom seat 5 into seat retainer upper surface 2a with bottom seat upper surface 5a facing upwards. FIG. 3.

17. The operator thereafter places second lower body O-ring 9b into lower seat retainer groove 1o formed by first and second seat retainer segment walls 2f, 2g respectively. FIGS. 3, 6.

18. The operator next places seat retainer 2 into body tube interior 1aa and congruently aligns retainer apertures 8a with tube body threaded openings 8aa.

19. The operator next (i) applies a thread lock adhesive well known in this industry to socket head cap threads 8a of socket head cap screws 8 and (ii) thereafter inserts each screw 8 through openings 8a, 8aa within seat retainer 2 and body tube 1c respectively.

20. Thereafter, each socket head cap screw 8 is (i) tightened in a circular criss-cross pattern well known in the industry and (ii) then torqued to 45 foot-pounds.

III. Tank Installation and Operation of Ball Valve Assembly 100

Referring primarily to FIG. 1BB, installation of the assembled ball valve assembly 100 along the bottom surface 300a of a railroad tank car 300 is a procedure well known in this particular industry, and in which the operator proceeds as follows:

1. He or she rotates ball component 4 to an open position using stem 3 to protect ball component 4 during the installation process.

2. The operator locates rail car bottom opening 300e through which liquid commodity 200 (i) will flow from rail car tank 300 and (ii) into ball valve assembly 100 through upper flange opening 1m.

3. The operator then orients ball valve assembly 100 so (i) ball valve assembly upper and lower flange openings 27m, 25t respectively and (ii) body tube upper and lower openings 1m, 1t respectively congruently align with rail car bottom opening 300e.

4. A flat gasket 7l is then inserted into circular gasket groove 27q within upper flange 27.

5. Ball valve assembly 100 is thereafter lifted upward towards the tank car mounting flange surface 70d with a suitable lifting device well known in this industry.

6. Drive coupling 17 is attached to stem 3 and (i) aligned longitudinally with the rail car tank bottom flange 56 (ii) so ball valve assembly mounting apertures 43a congruently and concentrically align with tank flange mounting apertures 70g.

7. The ball valve assembly 100 is now lifted upward until circular gasket groove 27q engages with tank mounting flange tongue 70b.

8. The operator next (i) inserts eight mounting bolts 43 into each corresponding upper flange aperture 43a and congruently aligned tongue apertures 70g and (ii) thereafter removes the conventional lifting device.

9. The operator (i) tightens mounting bolts 43 that alternate in a criss cross pattern and (ii) torques bolts 43 to 275 foot pounds as is conventionally done in this particular industry. Upper and lower flange circular openings 27m, 25t respectively, as well as body tube upper and lower openings 1m, 1t respectively. are now concentrically aligned below rail car circular opening 300e so liquid commodity 200 can flow through valve assembly 100 from rail car orifice 300e whenever ball component bore 4a is mechanically and physically continuous with openings 300e, 1m, 1t, 27m, and 25t.

8. The opening of ball valve assembly 100 proceeds as follows:

a. After the ball valve assembly 100 is operationally assembled and attached to rail car bottom surface 300a as described supra, the operator inserts a three-quarters inch square drive tool 20 into drive coupling 17.

b. By grasping drive coupling handle 20b, he or she then rotates stem 3 counterclockwise until stop indicated plate 12 contacts stop pin 11 in an open valve position of ball component 4.

9. Closing of ball valve assembly 100 proceeds as follows:

a. The operator inserts a three-quarters inch square drive tool 20 into drive coupling 17.

b. He or she then rotates stem 3 clockwise until stop indicator plate 12 contacts stop pin 11 in a closed position.

The above description of ball valve assembly 100 in the preferred embodiment and other embodiments does not in any manner diminish the scope of the invention to prevent leaks in other circumstances, structures and situations. The above description also does not in any manner diminish the scope of the invention in which the same improved features are implemented within rail road tank cars or other tanks in other embodiments.

The invention claimed is:

1. A ball valve assembly comprising a body tube, said body tube comprising a valve body tube interior surface, said ball valve assembly further comprising valve seats, a ball component, a stem packing assembly, and a valve stem, said ball component comprising a hard ball exterior surface, said ball valve assembly further comprising a single integral annular ceramic component comprising a single interior surface, said integral annular ceramic component consisting of first, second and third continuous rigid angled surfaces along said single interior surface of said integral annular component, said integral annular ceramic component comprising a material of sufficient hardness to neither distort or exhibit yielding behavior when said continuous angled surfaces contact said hard ball exterior surface, said integral annular ceramic component comprising a separate component from other remaining valve components, each said continuous angled surface being contiguous with at least one other of said continuous angled surfaces, said first continuous and contiguous angled surface conforming to a radius of said ball component, said first continuous and contiguous angled surface being located between said second and third continuous and contiguous angled surfaces, each of said first, second and third angled surfaces being different from each other, said continuous and contiguous angled surfaces comprising a scraping structural feature, said scraping structural feature scraping said hard ball exterior surface, said contiguous and continuous angled surfaces comprising a structural feature by which to push particles from said hard ball exterior surface.

2. The ball valve assembly of claim 1 wherein said integral annular ceramic componen comprises a wiper,
said wiper comprising approximately 4.056 inches in minimum interior diameter, approximately 5.628 inches in maximum exterior diameter and approximately 0.250 inch in thickness.

3. The ball valve assembly of claim 1 wherein said ceramic integral annular component and said ball component each comprise an identical zirconium oxide, said identical zirconium oxide exhibiting a Vickers hardness of 1150.

4. The ball valve assembly of amended claim 1
wherein said second contiguous and continuous angled surface comprises a pre-determined angle at which solids are pushed from said hard ball component exterior surface, and
said second contiguous and continuous angled surface being approximately 29 degrees from a perpendicular cross-section of said integral annular ceramic component.

5. The ball valve assembly of claim 1 further comprising a drive coupling,
said drive coupling comprising an integral single solid, said drive coupling being reversibly removable from said stem and a square drive tool,
said drive coupling comprising a sufficient thickness to withstand fracture upon application of torque,
said drive coupling comprising a smaller distal drive coupling longitudinal channel segment and a larger proximal drive coupling longitudinal channel segment,
said larger proximal drive coupling longitudinal channel segment being wider than said smaller distal drive coupling longitudinal channel segment,
said larger proximal drive coupling channel segment reversibly receiving said stem,
said smaller distal drive coupling longitudinal channel segment reversibly receiving each of a plurality of said square drive tools.

6. The ball valve assembly of claim 1 further comprising an integral one component drive coupling,
said drive coupling comprising a distal smaller drive coupling channel segment,
said distal smaller drive coupling channel segment reversibly receiving an inserted square drive tool,
said distal smaller drive coupling channel segment being square in perpendicular cross-section, said smaller drive coupling longitudinal channel segment comprising continuous rounded corners and a smooth longitudinal wall,
said drive coupling further comprising a proximal larger drive coupling segment, said stem reversibly inserting into said proximal larger drive coupling segment,
said proximal large drive coupling segment comprising a greater cross-sectional area than said cross sectional area of said distal smaller drive coupling channel segment.

7. The ball valve assembly of claim 1 wherein said annular integral ceramic component comprises a wiper,
said wiper comprising an upper wiper surface and an exterior wiper surface,
said wiper comprising a single continuous smooth circular wiper groove along said exterior wipe surface and said upper wiper surface,
said valve further comprising a single upper flange groove,
said upper flange groove and said circular wiper groove creating a circular O-ring notch when said upper flange groove and said circular wiper groove are contiguous and contact each other.

8. The ball valve assembly of claim 1 wherein said integral annular ceramic component comprises a wiper, said wiper comprising an upper wiper surface and a lower wiper surface,
said wiper comprising a perpendicular cross-section,
said first continuous and contiguous angled surface comprising a single continuous circular wiper chamfer,
said second continuous and contiguous angled surface comprising a first bevel and said third continuous and contiguous angled surface comprising a second bevel,
said single continuous circular wiper chamfer opening upwardly and outwardly to say upper wiper surface from said lower wiper surface at an angle of approximately 45 degrees from said perpendicular cross-section of said wiper.

9. The ball valve assembly of claim 1 further comprising a drive coupling,
said drive coupling comprising a physically integral device, said drive coupling being separate and distinct from said stem or a square drive tool,
said drive coupling being reversibly removable from said stem and each of a variety of square drive tools,
said drive coupling comprising a larger proximal drive coupling channel segment and a small distal drive coupling channel segment,
said larger proximal drive coupling channel segment comprising a greater cross-sectional dimension than said small distal drive coupling channel segment,
said drive coupling further comprising a mechanical fastener,
said mechanical fastener penetrating said drive coupling and reversibly inserting into said valve stem,
said mechanical fastener thereby reversibly attaching said drive coupling to said valve stem.

10. The ball valve assembly of claim 1 wherein said integral annular ceramic component comprises a wiper, said wiper comprising a single upper wiper surface and a single lower wiper surface and a wiper interior surface,
said wiper comprising a perpendicular cross-section,
said first continuous and contiguous angled wiper surface comprising a wiper circular continuous chamfer,
said third continuous and contiguous angled surface comprising a single continuous lower circular wiper bevel,
said single continuous lower circular wiper bevel comprising an angle of approximately 72 degrees from said perpendicular cross-section of said wiper.

11. The ball valve assembly of claim 1 wherein said integral annular ceramic component comprises wiper,
- said wiper comprising an upper wiper surface, a lower wiper surface and an exterior wiper surface and wherein said single interior surface comprises an interior wiper surface,
- said wiper comprising single wiper circular chamfer that opens upwardly and outward to said upper wiper surface from said wiper interior surface,
- said wiper comprising a perpendicular cross-section,
- said single circular wiper chamfer comprising an angle of 45 degrees from said perpendicular cross-section of said wiper, and
- said second continuous and contiguous angled surface comprising an upper bevel, and
- said upper bevel comprising an angle of approximately 29 degrees from said perpendicular cross section of said wiper.

12. The ball valve assembly of claim 1
wherein said single integral annular ceramic component comprises a wiper, said wiper comprising a perpendicular cross-section, and
said third continuous and contiguous angled surface comprising a lower continuous circular wiper bevel, said lower continuous circular wiper bevel comprising an angle of 72 degrees from said perpendicular cross-section of said ceramic component.

13. The ball valve assembly of claim 1 wherein said integral annular ceramic component comprises zirconium oxide,
- said zirconium oxide comprising a hardness HV5 of 1650 kg/mm2, tensile strength of 70 kips and thermal expansion of 25-200C 8,50E-6, or
- said zirconium oxide comprising a hardness HV5 of 1150 Kg/mm$^2$, tensile strength of 85 kips and thermal expansion of 25-200C 9.90E-06.

14. The ball valve assembly of claim 1 further comprising a drive coupling, said drive coupling reversibly attaching to each of a variety of square drive tools and a valve stem,
- said drive coupling being approximately 1.75 inches in diameter of a perpendicular cross section of said drive coupling
- said drive coupling comprising a continuous longitudinal channel wherein said longitudinal channel is square in said perpendicular cross-section of said drive coupling.

* * * * *